US009428132B2

(12) United States Patent
Obadia et al.

(10) Patent No.: US 9,428,132 B2
(45) Date of Patent: Aug. 30, 2016

(54) AIRCRAFT AIRBAG SYSTEM

(71) Applicant: Zodiac Seats France

(72) Inventors: Jean-Marc Obadia, Maubec (FR); John Payne, Huntington Beach, CA (US); Jeremy Cailleteau, St. Aout (FR); Nick Lee, Huntington Beach, CA (US); Nathan Kwok, Huntington Beach, CA (US); Jean-Marie Daout, Mukilteo, WA (US); Jake Story, Bothell, WA (US); David Knox, Los Osos, CA (US)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 13/912,937

(22) Filed: Jun. 7, 2013

(65) Prior Publication Data

US 2014/0027574 A1  Jan. 30, 2014

Related U.S. Application Data

(60) Provisional application No. 61/696,697, filed on Sep. 4, 2012, provisional application No. 61/656,983, filed on Jun. 7, 2012, provisional application No. 61/810,204, filed on Apr. 9, 2013.

(51) Int. Cl.
*B60R 21/20* (2011.01)
*B64D 11/00* (2006.01)
(Continued)

(52) U.S. Cl.
CPC .............. *B60R 21/20* (2013.01); *B64D 11/00* (2013.01); *B64D 25/02* (2013.01); *B60R 2021/0093* (2013.01); *B64D 2201/00* (2013.01)

(58) Field of Classification Search
CPC .......... B60R 21/20; B60R 2021/0093; B64D 11/00; B64D 11/0619; B64D 25/02
USPC ............ 280/728.1, 728.2, 728.3; 244/118.5, 244/118.6, 121, 122 R
See application file for complete search history.

(56) References Cited

U.S. PATENT DOCUMENTS 2,418,798 A    4/1947  Whitmer
2,977,898 A *  4/1961  Candlin, Jr. .................. 105/340
(Continued)

FOREIGN PATENT DOCUMENTS

EP     2543553 A1    1/2013
WO     2011/087160 A1   7/2011
WO     2013/141948 A1   9/2013

OTHER PUBLICATIONS

International Search Report and Written Opinion issued Feb. 26, 2014 for PCT/IB2013/002257, 12 pages.

*Primary Examiner* — Barry Gooden, Jr.
(74) *Attorney, Agent, or Firm* — Kilpatrick Townsend & Stockton LLP; Dean W. Russell; Kristin M. Crall

(57) ABSTRACT

An airbag system assembly configured to be positioned in the interior of a vehicle that includes an aft wall configured to be positioned forward of a passenger seat and an airbag system. The aft wall includes front and aft surfaces and the aft wall includes a first flap that is formed by a plurality of weakness lines in at least the front surface thereof. The airbag system includes at least a first airbag module having a first airbag support plate with front and aft surfaces. The first airbag support plate is secured to the front surface of the aft wall, and the first airbag support plate includes a first airbag that is configured to deploy in the event of a crash condition and that is disposed on the aft surface of the first airbag support plate. The first airbag is positioned adjacent the first flap.

20 Claims, 27 Drawing Sheets

(51) Int. Cl.
  *B64D 25/02* (2006.01)
  *B60R 21/00* (2006.01)

(56) References Cited

U.S. PATENT DOCUMENTS

| | | | |
|---|---|---|---|
| 3,603,535 A | | 9/1971 | DePolo |
| 4,565,535 A | * | 1/1986 | Tassy .......................... 441/118 |
| 5,085,382 A | | 2/1992 | Finkenbeiner |
| 5,340,059 A | | 8/1994 | Kanigowski |
| 5,415,429 A | | 5/1995 | Fisher |
| 5,435,594 A | * | 7/1995 | Gille .......................... 280/728.2 |
| 5,482,230 A | | 1/1996 | Bird et al. |
| 5,558,300 A | * | 9/1996 | Kalberer et al. ............. 244/121 |
| 5,649,721 A | | 7/1997 | Stafford |
| 5,716,026 A | | 2/1998 | Pascasio |
| 5,738,368 A | | 4/1998 | Hammond et al. |
| 5,791,597 A | | 8/1998 | Knoll |
| 6,217,066 B1 | * | 4/2001 | Coleman et al. ............. 280/737 |
| 6,682,141 B2 | | 1/2004 | Reynolds |
| 6,896,224 B1 | * | 5/2005 | Goodwin ...................... 244/121 |
| 7,648,167 B2 | | 1/2010 | Bouquier |
| 8,523,220 B1 | * | 9/2013 | Gehret et al. ............... 280/730.1 |
| 2007/0007384 A1 | * | 1/2007 | Sliwa, Jr. ........................ 244/30 |
| 2009/0178597 A1 | * | 7/2009 | Sliwa, Jr. ...................... 109/49.5 |
| 2009/0267329 A1 | * | 10/2009 | Kalisz et al. ............... 280/728.3 |
| 2010/0276540 A1 | * | 11/2010 | Rojo ............................. 244/121 |
| 2011/0062686 A1 | * | 3/2011 | Buhler ....................... 280/728.3 |
| 2011/0272523 A1 | * | 11/2011 | Uegaki ...................... 244/100 A |
| 2012/0325964 A1 | * | 12/2012 | Hawkins et al. .......... 244/118.6 |
| 2013/0009009 A1 | | 1/2013 | Islam |
| 2013/0009389 A1 | | 1/2013 | Islam |
| 2013/0009430 A1 | * | 1/2013 | Islam et al. ................ 297/216.1 |
| 2013/0088056 A1 | | 4/2013 | Quatanens |
| 2013/0106079 A1 | | 5/2013 | Jarboe |
| 2013/0241180 A1 | * | 9/2013 | Gehret et al. ............. 280/728.2 |
| 2015/0042078 A1 | * | 2/2015 | Gehret et al. ............. 280/728.2 |

* cited by examiner

AIRCRAFT AIRBAG SYSTEM

CROSS REFERENCE TO RELATED APPLICATIONS

This application claims the benefit of U.S. Provisional Application No. 61/656,983, filed Jun. 7, 2012, U.S. Provisional Application No. 61/696,697, filed Sep. 4, 2012, and U.S. Provisional Application No. 61/810,204, filed Apr. 9, 2013 which are all herein incorporated by reference in their entireties.

FIELD OF THE INVENTION

The present invention relates generally to aircraft monuments and more particularly to an aircraft monument that is positioned forward of passenger seats and includes an airbag system.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, closets, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety and to find ways to add seats in order to increase revenue. Commercial passenger aircraft generally include closets for use by passengers and crew.

Prior art aircraft monuments are typically fixed structures with a rectangular footprint. In some aircraft, the is positioned just forward of the passenger seats.

SUMMARY OF THE PREFERRED EMBODIMENTS

Figure 1:
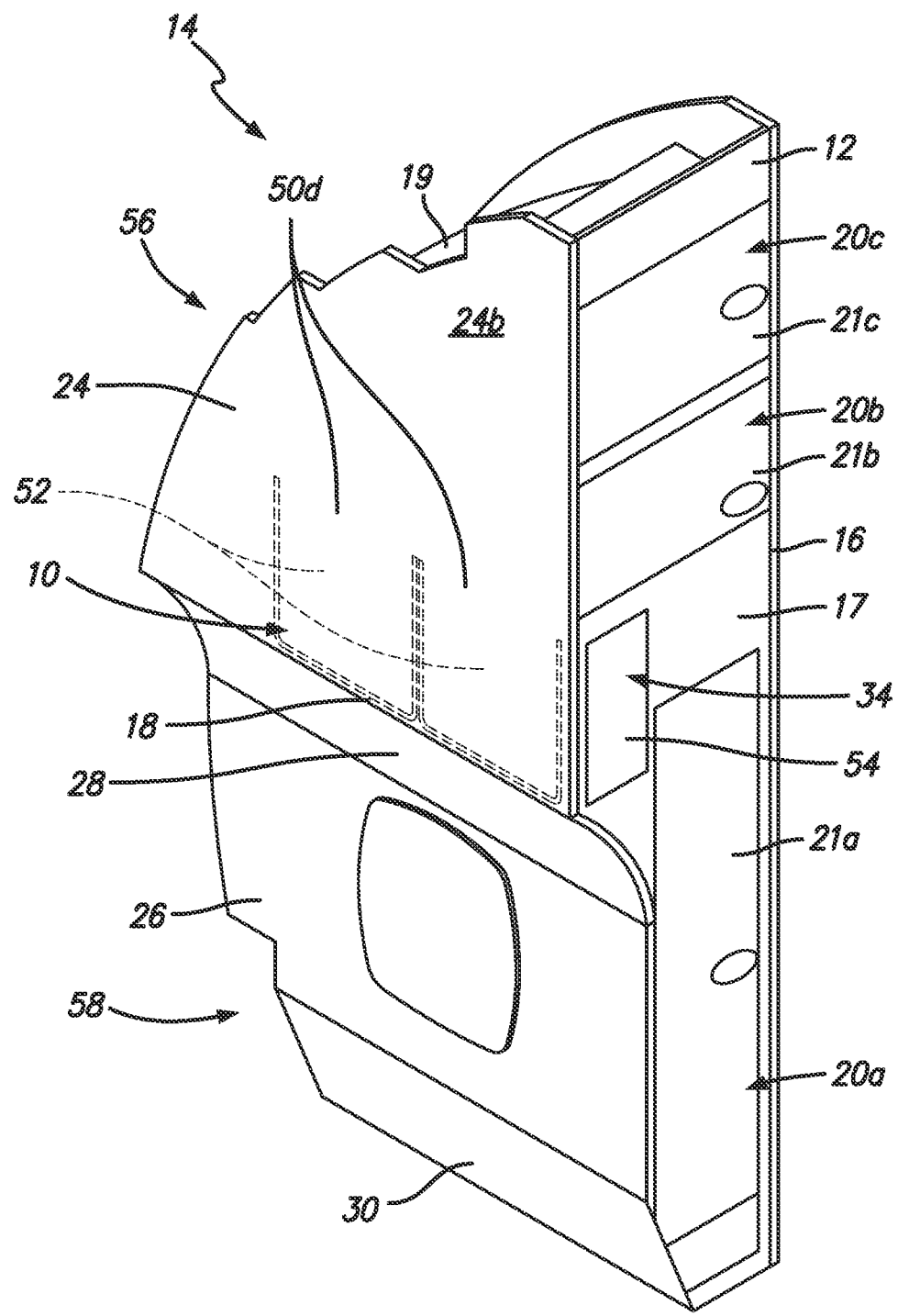
FIG. 1 is a perspective view of an closet monument assembly in accordance with a preferred embodiment of the present invention and showing the flaps in hidden lines.

In accordance with a first aspect of the present invention there is provided an airbag system assembly configured to be positioned in the interior of a vehicle that includes an aft wall configured to be positioned forward of a passenger seat and an airbag system. The aft wall includes front and aft surfaces and the aft wall includes a first flap that is formed by a plurality of weakness lines in at least the front surface thereof. The airbag system includes at least a first airbag module having a first airbag support plate with front and aft surfaces. The first airbag support plate is secured to the front surface of the aft wall, and the first airbag support plate includes a first airbag that is configured to deploy in the event of a crash condition and that is disposed on the aft surface of the first airbag support plate. The first airbag is positioned adjacent the first flap. In a preferred embodiment, the plurality of weakness lines include a left weakness line, a right weakness line and one of a top or a bottom weakness line that cooperate to define one of a top hinge section or a bottom hinge section. Preferably, the airbag system includes a least a second airbag module having a second airbag support plate with a front surface and an aft surface. The second airbag support plate is secured to the front surface of the aft wall, wherein the second airbag support plate includes a second airbag that is configured to deploy in the event of a crash condition and that is disposed on the aft surface of the second airbag support plate. The second airbag is positioned adjacent the first flap, and the first and second airbags are configured to be associated with a separate passenger in the vehicle.

In a preferred embodiment, the airbag system further comprises at least a first inflator tank that is positioned on the front surface of the first airbag support plate. Preferably, the aft wall includes an upper panel, a lower panel and a transition panel positioned between the upper and lower panels. The upper panel and lower panel are positioned such that they are not aligned vertically. In a preferred embodiment, the second airbag module is positioned below the first airbag module on the aft wall. The first airbag module is positioned such that it will be contacted by a passenger's head in the event of a crash condition, and the second airbag module is positioned such that it will be contacted by a portion of the passenger's anatomy below the head. In another embodiment, the airbag is configured such that after it deploys it is large enough to be contacted by a passenger's head and a portion of the passenger's anatomy below the head.

In accordance with another aspect of the present invention, there is provided a closet monument assembly configured to be positioned in the interior of a vehicle. The closet monument assembly includes a closet monument that includes a front wall, no aft wall, an outer wall and an inner wall that cooperate to define a monument interior. The inner wall includes at least a first door that provides access to a first storage compartment, and an airbag system mounted on the aft wall or disposed within the monument interior. The airbag system includes at least a first airbag that is configured to deploy in the event of a crash condition. The aft wall includes a front surface and an aft surface. The airbag system is disposed within the monument interior and is secured to the front surface of the aft wall. The aft wall includes a first flap that is formed by a plurality of weakness lines in the front surface thereof, and the first airbag is positioned adjacent the first flap. In a preferred embodiment, the airbag system is at least partially housed within an airbag compartment, and the inner wall includes an airbag access door that provides access to the airbag compartment. Preferably, the closet monument includes an upper portion and a lower portion, and the upper portion has a greater depth than the lower portion.

In accordance with yet another aspect of the present invention, there is provided, a galley monument assembly configured to be positioned in the interior of vehicle. The galley monument assembly includes a galley monument that includes a front wall, an aft wall, an outer wall and an inner wall that cooperate to define a monument interior. The aft wall includes a front surface and an aft surface, a first flap that is formed by a first set of weakness lines formed in the aft wall, and a second flap that is formed by a second set of weakness lines formed in the aft wall. The galley monument assembly also includes first and second airbag modules that include first and second airbag support plates respectively secured to the aft wall of the galley monument. The first and second airbag support plates each include a front surface and an aft surface. A first airbag that is configured to deploy in the event of a crash condition and that is disposed on the all surface of the first airbag support plate, and a second airbag that is configured to deploy in the event of a crash condition and that is disposed on the aft surface of the second airbag support plate. The first airbag is positioned adjacent the first flap and the second airbag is positioned adjacent the second flap. In a preferred embodiment, the weakness lines comprise tear seams formed in the aft wall. Preferably, the first airbag support plate includes a first inflator tank secured to the front surface thereof, and the second airbag support plate includes a second inflator tank secured to the front surface thereof. In another embodiment, the first airbag module includes a first inflator tank secured to a portion of the galley monument at a location remote from the first airbag support plate, and the second airbag module includes a second inflator tank secured to a portion of the galley monument at a location remote from the second airbag support plate.

In a preferred embodiment, the galley monument assembly further includes a third airbag module that includes a third airbag support plate secured to the aft wall of the galley monument. The third airbag support plate includes a front surface and an aft surface and a third airbag that is configured to deploy in the event of a crash condition and that is disposed on the aft surface of the third airbag support plate. The third airbag is positioned adjacent a third flap formed by a third set of weakness lines formed in the aft wall. Preferably, at least the first airbag module includes a first door positioned adjacent the first airbag support plate. The first door is movable between an open and a closed position and is hingedly secured to the front surface of the aft wall by a flexible strap.

Embodiments of the present invention relate generally to airbags for use in passenger transport vehicles. The airbags are designed to safely interrupt a passenger's forward momentum in the event of a crash condition. In a preferred embodiment, the present invention includes an aircraft closet airbag system that includes a monument that is preferably positioned forward of a row of passenger seats (such as the first row). The system includes a support assembly that secures the airbags to the aft wall of the closet and directs the airbags outwards toward the passengers when deployed. In a preferred embodiment, the aft wall of the closet facilitates airbag deployment via a partially cut (structurally weakened) wall. The airbags are preferably deployed via at least one gas inflator which is controlled by an airbag control unit. This unit detects crash conditions and activates the gas inflator accordingly.

In another embodiment, the airbag module (airbag cushion, box, and inflator, etc.) can be attached to the outside of the monument wall (as opposed to being inside the monument).

In use, the front row monument can allow passenger seats to be moved closer to the monument than the current certifiable distance. This can provide for the insertion of an additional passenger row on the aircraft. However, this is not a limitation on the present invention. The reason for this is that the airbag system has been positioned in the aft section of the monument, thereby allowing the certifiable headstrike distance to be reduced.

U.S. Patent Publication Nos. 2013/0088056 to Quatanens and 2013/0106079 to Jarboe are incorporated herein by reference in their entireties.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Furthermore, it will be understood that the use of "aft," "front," "inner" and "outer" in reference to the components of the closet monument assemblies described herein refer to the orientation of the closet monument assembly when positioned in an aircraft.

Referring now to the drawings, wherein the showings are for purposes of illustrating the present invention and not for purposes of limiting the same, FIGS. 1-13 show embodiments of an airbag system 10 that is incorporated in a closet monument 12 (referred to together herein generally as closet monument assembly 14). In particular, the invention is contemplated for use on commercial passenger aircraft. However, this is not a limitation on the present invention and the airbag system be used elsewhere.

In a preferred embodiment, the closet monument assembly 14 is configured to be located in the forward section of the aircraft. However, this is not a limitation on the present invention. The closet monument assembly 14 can be located at any position in an aircraft.

It should be understood, that the airbag system 10 can be implemented in other aircraft monuments or components, and does not have to be limited to a closet. For example, the airbag system 10 can be positioned in or on a lavatory monument wall or a galley monument wall or any other bulkhead or component that is positioned forward of passenger or crew seating. The use of a closet monument in herein is only exemplary.

As shown in FIGS. 1-5, the closet monument assembly 14 generally includes the closet monument 12 and the airbag system 10. the closet monument 12 generally includes a front wall 16, aft wall 18, inner wall 17 and outer wall 19 that cooperate to define a monument interior 12a. The closet monument 12 also includes first, second and third storage compartments 20a, 20b and 20c (which include doors 21a, 21b and 21c). As is known, the closet in monument 12 is shaped to fit snugly against the inner wall of an aircraft. First, second and third storage compartments 20a, 20b and 20c are shown in the figures. However, any number of storage compartments is within the scope of the present invention.

Figure 3:
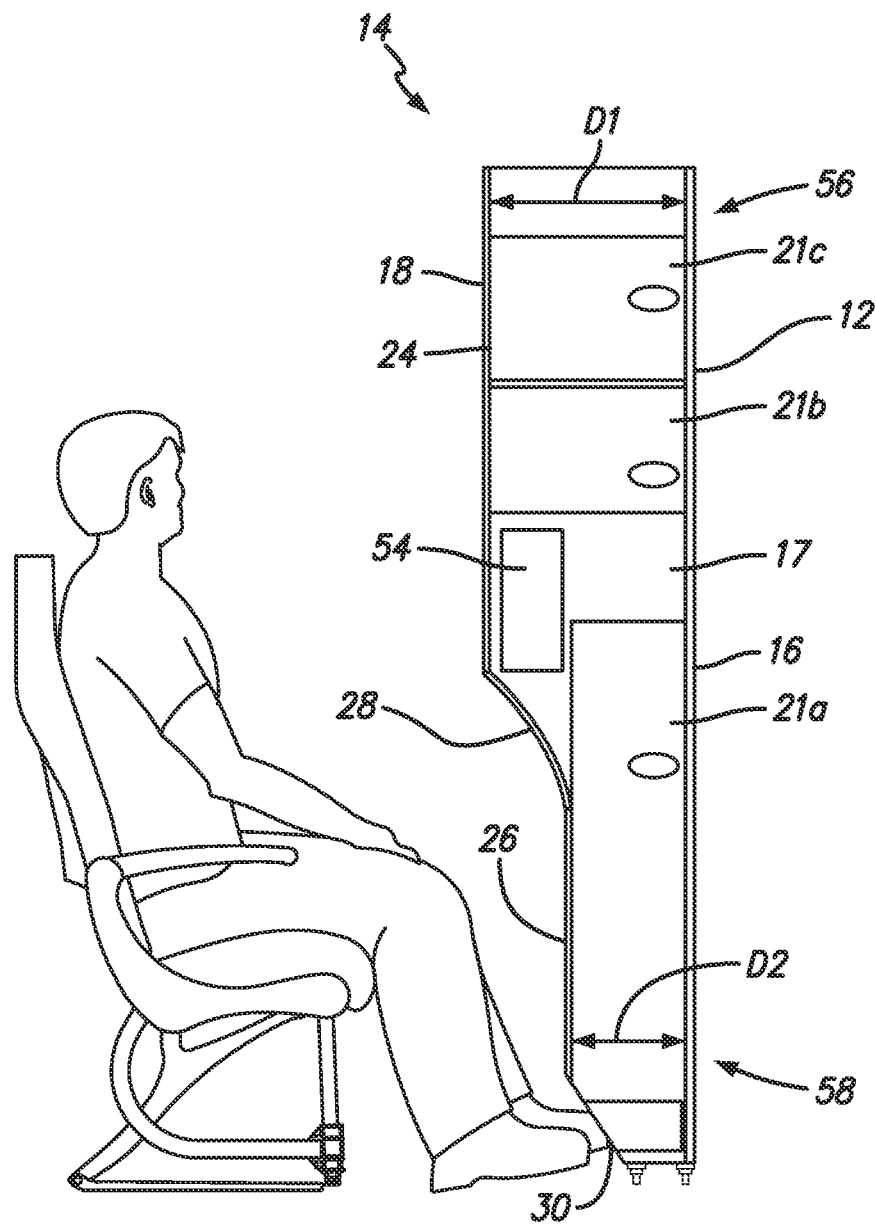
FIG. 3 is a side elevational view of the closet monument assembly of FIG. 1 and showing a passenger sitting in a seat adjacent thereto.
Figure 6:
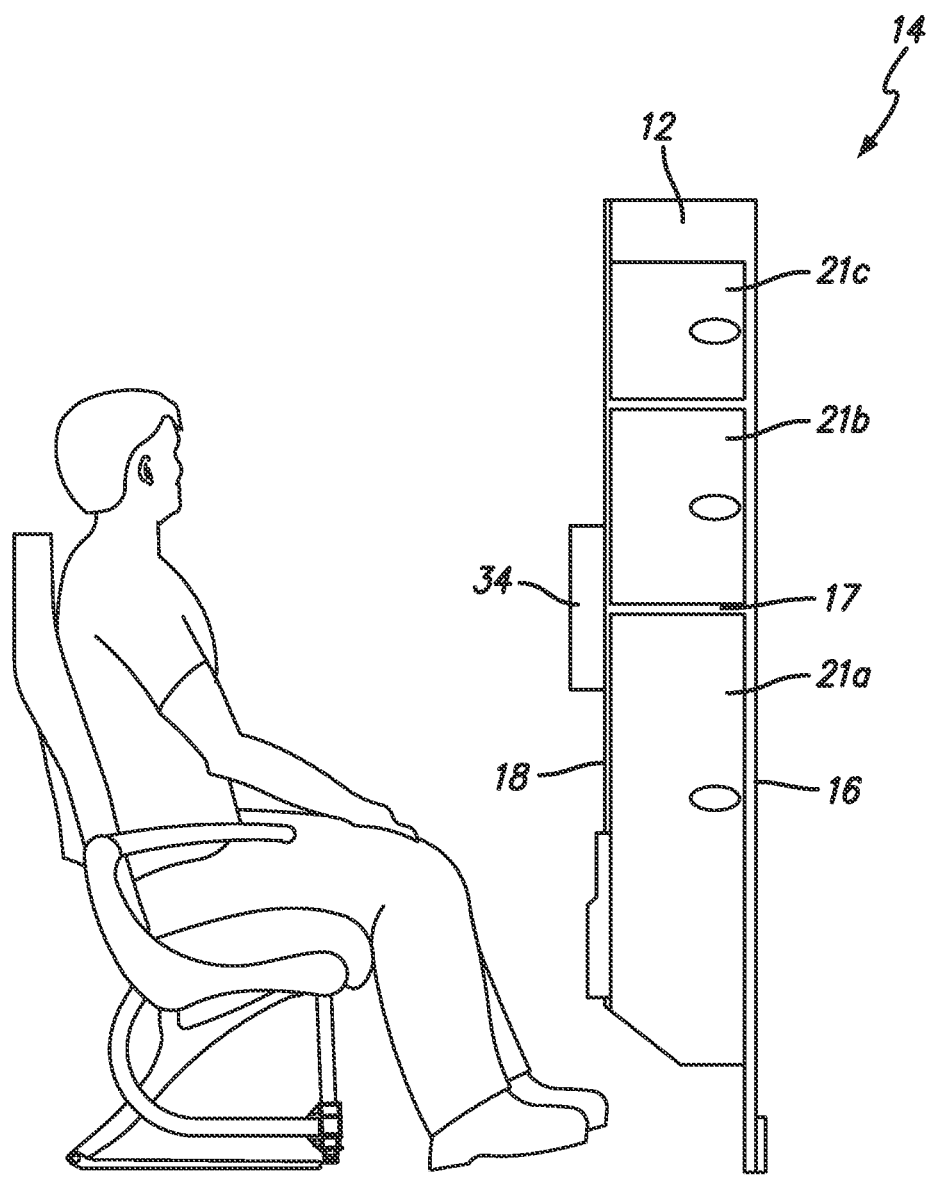
FIG. 6 is a side devotional view of an closet monument assembly in accordance with another preferred embodiment of the present invention.

In a preferred embodiment, aft wall 18 includes an upper panel 24, a lower panel 26 and a transition panel 28 therebetween. Preferably, as shown in FIG. 3, aft wall 18 also includes a foot rest panel 30 that angles away from a seated passenger either in a straight line or at a curve and provides extra foot space. In other words, the foot rest panel 30 angles downwardly from the lower panel 26 toward the front wall 16. As shown in FIG. 6, in another embodiment, the foot rest panel 30 can be spaced from the floor and extend rearwardly generally parallel to the ground. In other words, the foot rest panel 30 can extend at any angle between 0° (vertical) and 90° (horizontal).

In a preferred embodiment, airbag system 10 includes an airbag module 32 that is positioned within an airbag compartment 34 and adjacent or secured to aft wall 18. Preferably, airbag system 10 is disposed in the upper portion of closet monument 12 and the airbag module 32 is therefore positioned adjacent or secured to the upper panel 24 of aft wall 18. However, this is not a limitation and the airbag module 32 can also be positioned adjacent or secured to the lower panel 26, the transition panel 28 or a combination of any of these panels.

Figure 4:
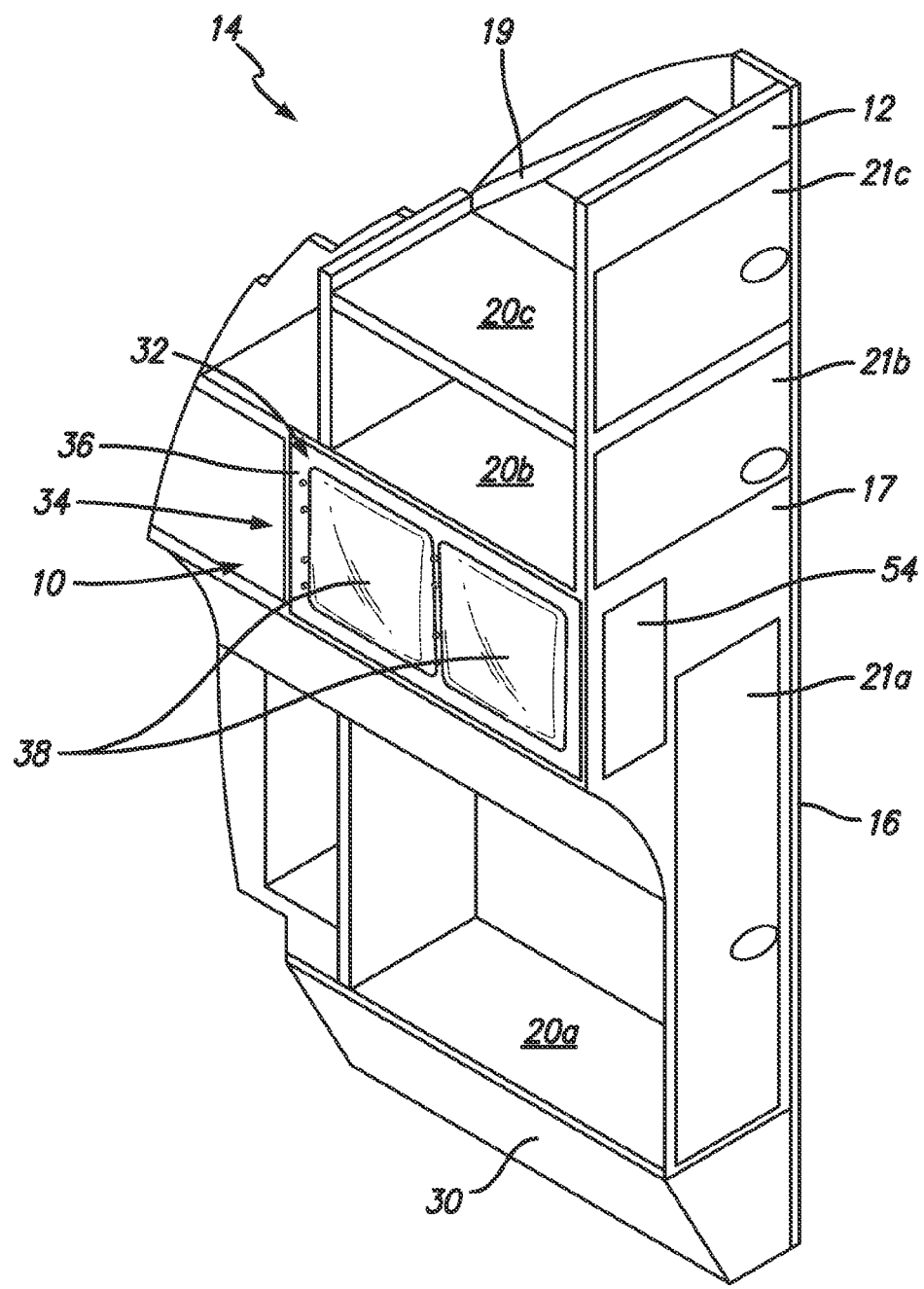
FIG. 4 is a perspective view of the closet monument assembly of FIG. 1 with the upper panel and lower panel removed to show the components therein.
Figure 4A:
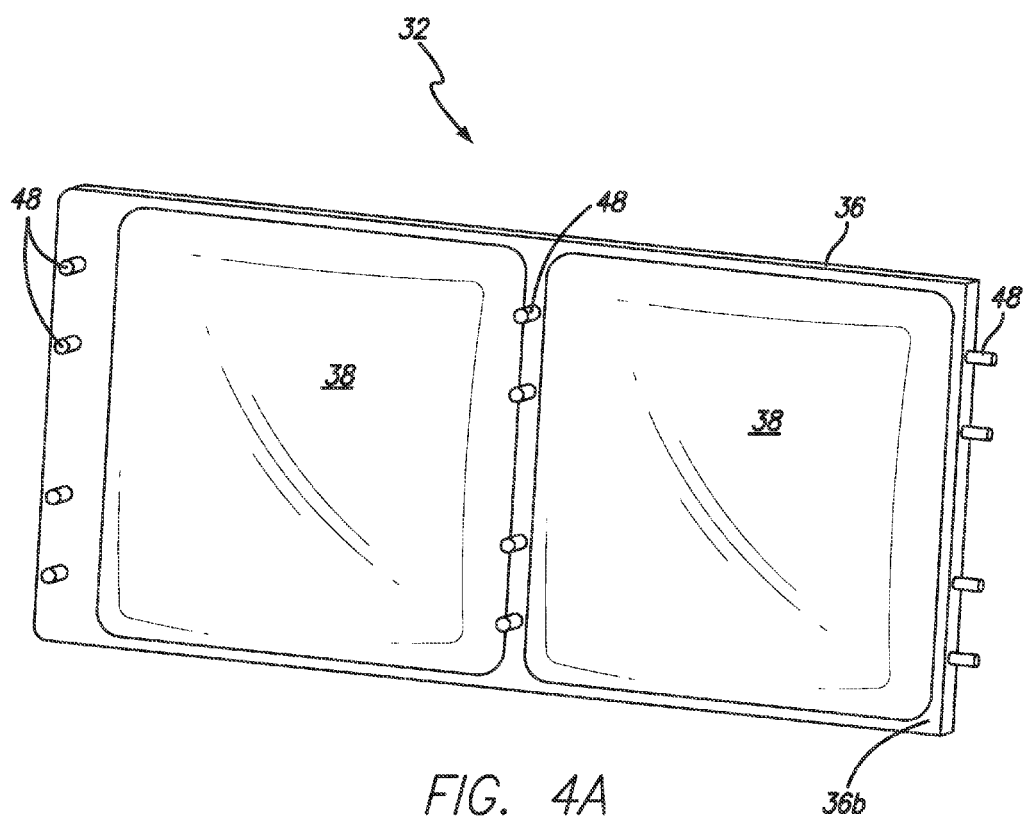
FIG. 4A is a perspective rear view of the airbag module of the closet monument assembly of FIG. 1.
Figure 5:
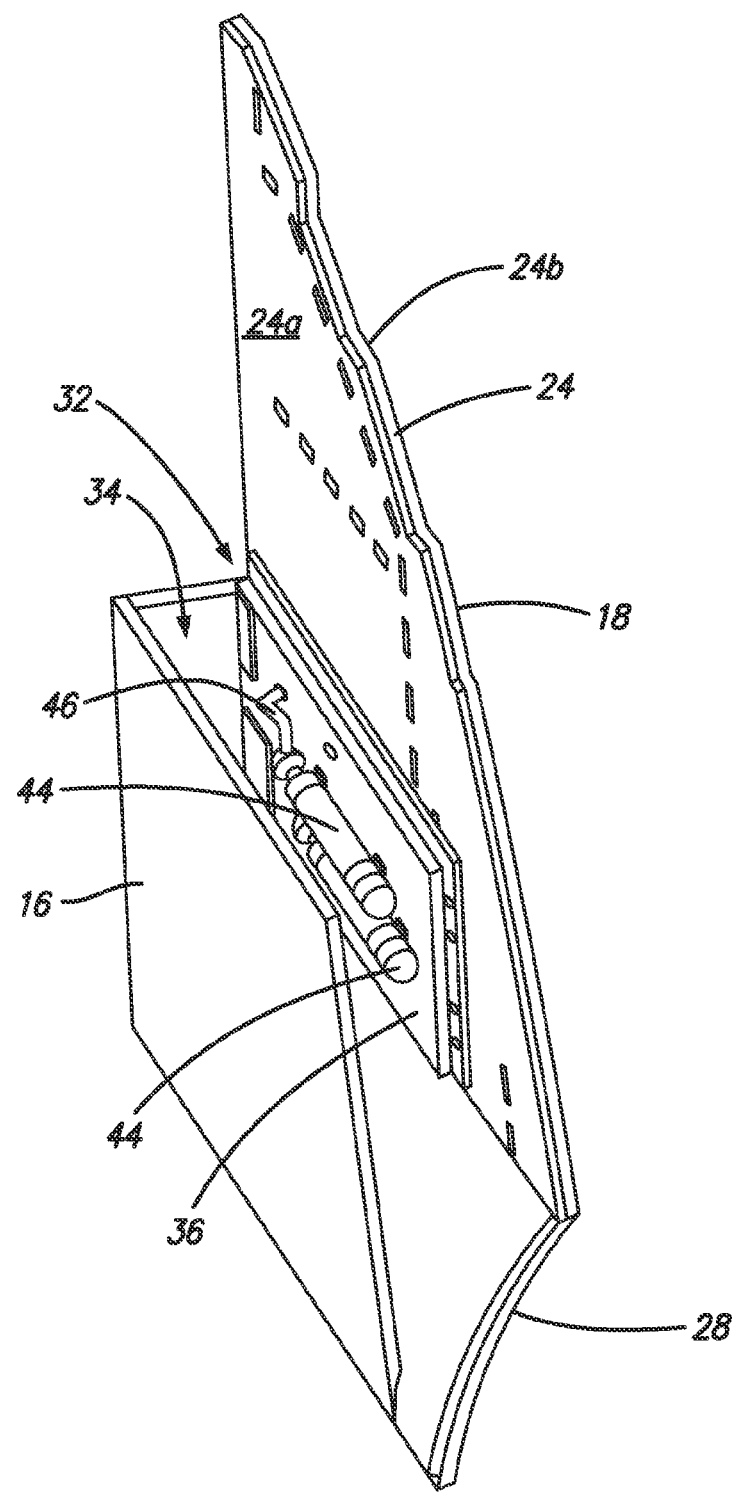
FIG. 5 is an inside view of a portion of the closet monument assembly of FIG. 1, showing the airbag module disposed therein.
Figure 5A:
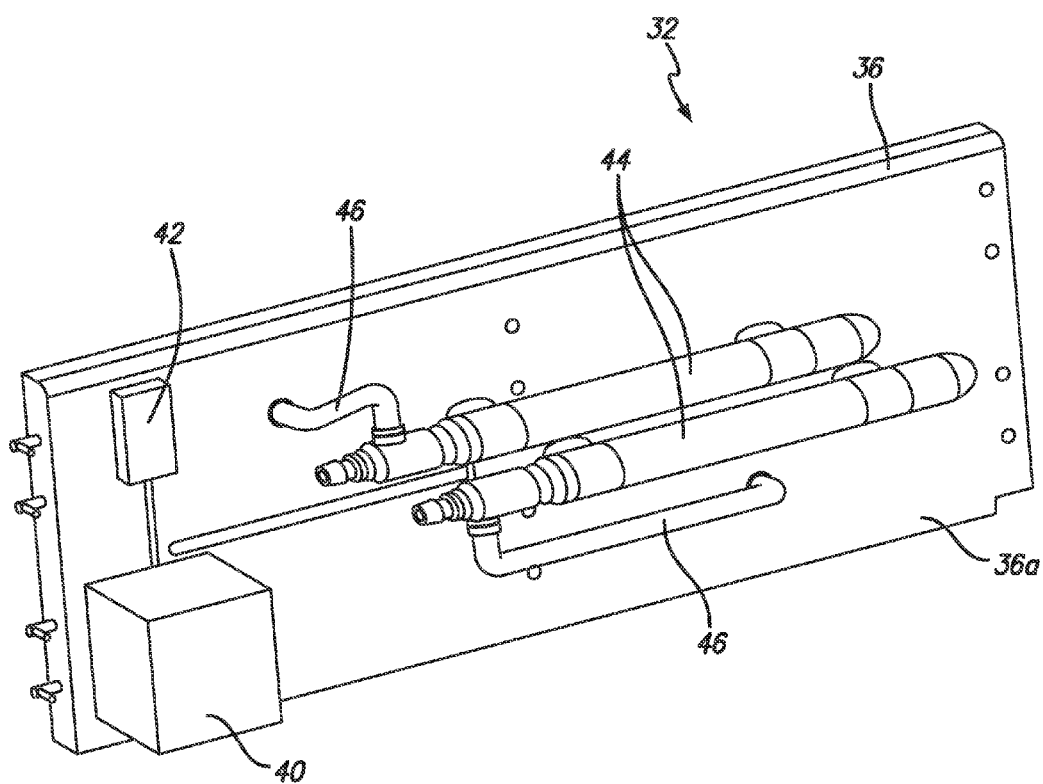
FIG. 5A is a perspective front view of the airbag module of the closet monument assembly of FIG. 1.

As shown in FIGS. 4A-5A, in a preferred embodiment, the airbag module 32 includes an airbag support plate 36 having a front surface 36*a* and an aft surface 36*b*. Preferably, one or more airbags 38 are mounted on the aft surface 36*b* of the airbag support plate 36 and additional components needed for the operation of the airbags 38 are mounted on the front surface 36*a* of the airbag support plate 36. Such additional components include, but are not limited to, a power control board 40, a RFID antennae 42, inflator tanks 44 and inflator tubes 46. Positioning these components on the airbag support plate 36 is not a limitation on the present invention. For example, some, any or all of these components can be positioned on or secured to other walls or panels of the monument or positioned in any free space within the monument or elsewhere. As shown in FIG. 4A, in a preferred embodiment, airbag support plate 36 includes screws, posts or any type of fixation cans 48 for mounting to the aft wall 18.

Figure 1A:
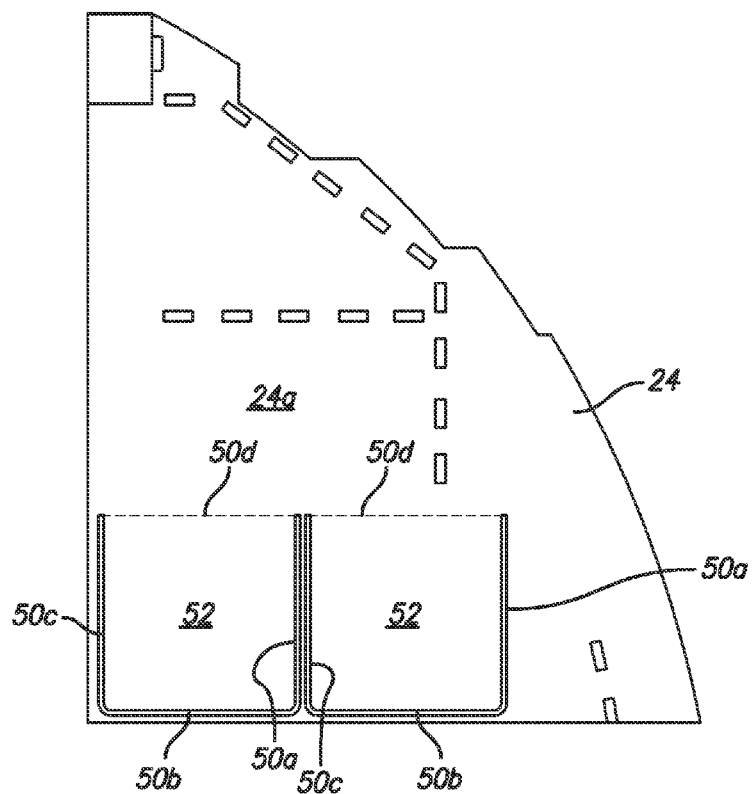
FIG. 1A is an devotional view of the inside surface of the upper panel of the closet monument assembly of FIG. 1 showing the scores made therein.
Figure 1B:
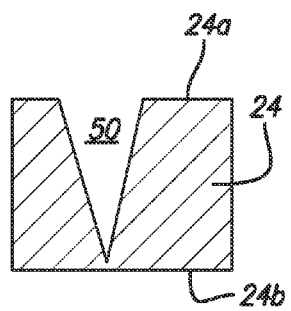
FIG. 1B is a cross-sectional view showing the V-shaped profile of one of the scores.
Figure 1C:
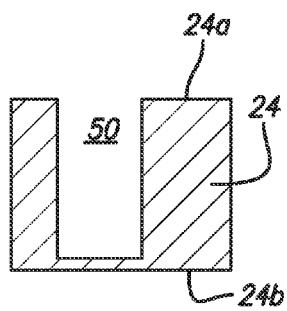
FIG. 1C is a cross-sectional view showing another profile shape of one of the scores.
Figure 1D:
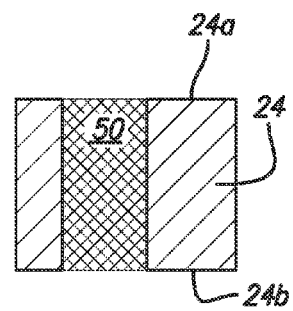
FIG. 1D is a cross-sectional view of a tear seam.
Figure 2:
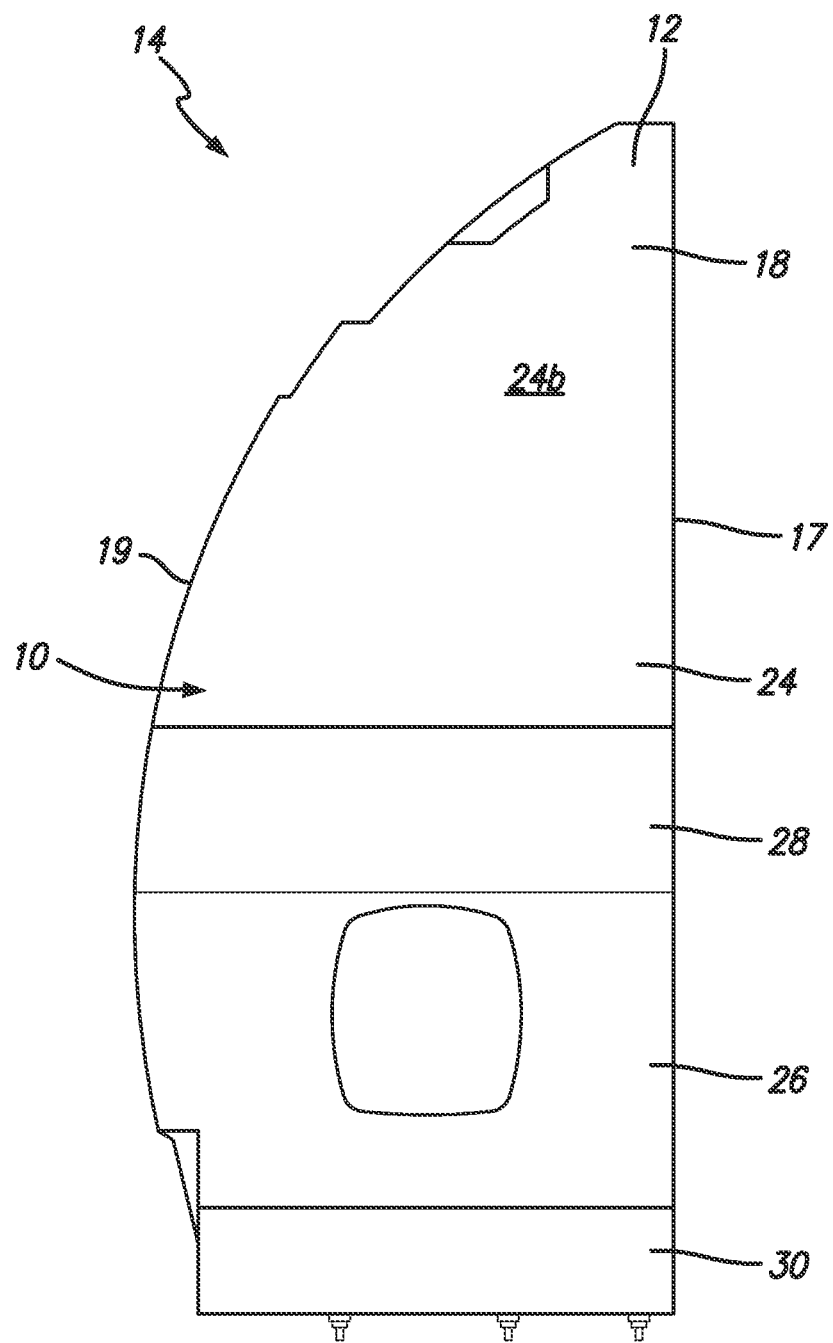
FIG. 2 is a rear elevational view of the closet monument assembly of FIG. 1.

As shown in FIGS. 1A-1C, in a preferred embodiment, the upper panel 24 includes partial cuts or scores 50 made therein that make it easier for the deployed airbags 38 to break through aft wall 18. In another embodiment, the upper panel 24 or aft wall 18 can include a tear seam (see FIG. 1D and further description below), fault line, series of dashed lines/cuts or other weakness line. In another embodiment, at least a portion of the scores 50 can be cut all the way through aft wall 18. In another embodiment, the aft wall 18 can include tear seams with fabric or the like therein that creates a weakness line. The tear seam can be integrated into the panel itself (i.e., honeycomb panel) or into a decorative film or fabric covering the panel. Preferably, as shown in FIG. 1B, the scores 50 are made in the front surface 24*a* and do not extend all the way to aft surface 24*b*. In this embodiment, the upper panel 24 is frangible, however, passengers will not see any cuts or realize that airbags are positioned behind the wall. Any weakness line that allows the airbag to break through the wall, panel, film, fabric, etc. of the partition, monument, etc. is within the scope of the present invention. Accordingly, any score, cut, tear seam, weakness, dashed line, dotted line or the like are described herein or known to one of skill in the art is referred to generally herein as a weakness line.

With respect to a score, any score profile is within the scope of the present invention, however, a "V" shaped cut profile, as shown in FIG. 1B is preferred. For example, the angle can be between 0° and 70°. In another embodiment, the score can have a "U" shape with either a curved bottom or flat bottom, as shown in FIG. 1C. Furthermore, as shown in FIG. 1A, in a preferred embodiment, the scores 50 define a flap 52 that comprises left, right and bottom scores 50*a*, 50*b* and 50*c* that cooperate to define a top hinge section 50*d*. In this embodiment, no score is made on the top of the flap 52, which creates the top hinge section 50*d*. In the event of airbag 38 deployment, airbag 38, which is aligned with flap 52, breaks through aft wall 18, but flap 52 does not break-away, but instead pivots upwardly. This helps protect the passengers. In another embodiment, the flap 52 includes left, right and top scores that cooperate to define a bottom hinge section. Left and right hinge sections are also within the scope of the invention. In another embodiment, the flap 52 can be defined by weakness lines 50 that extend all the way therearound. In this embodiment, the flap 52 completely tears away from the aft wall 18. In a preferred embodiment, airbag compartment 34 includes an airbag access door 54 thereon. This allows for access to the airbag system 10 and for maintenance to be performed thereon. It will be appreciated that FIG. 1 shows the flaps 52 and scores in hidden lines even though a passenger preferably cannot see anything on the aft surface of the aft wall 18.

Figure 17:
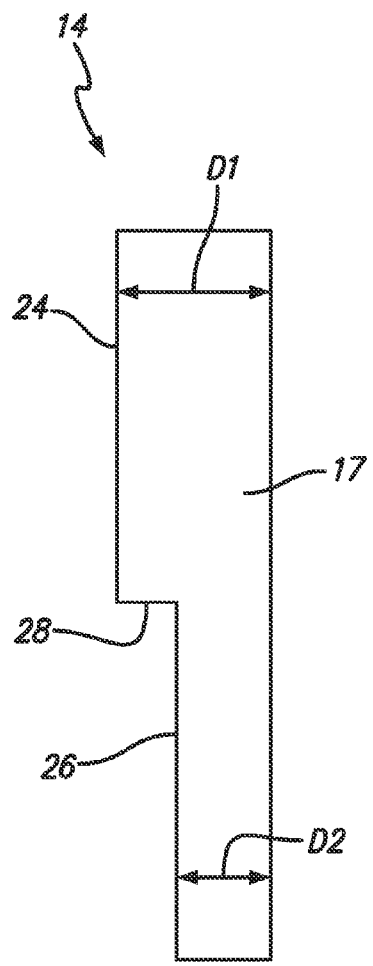
FIG. 17 is a side elevational view of the outside shape of the another embodiment of a monument assembly as taught herein.
Figure 18:
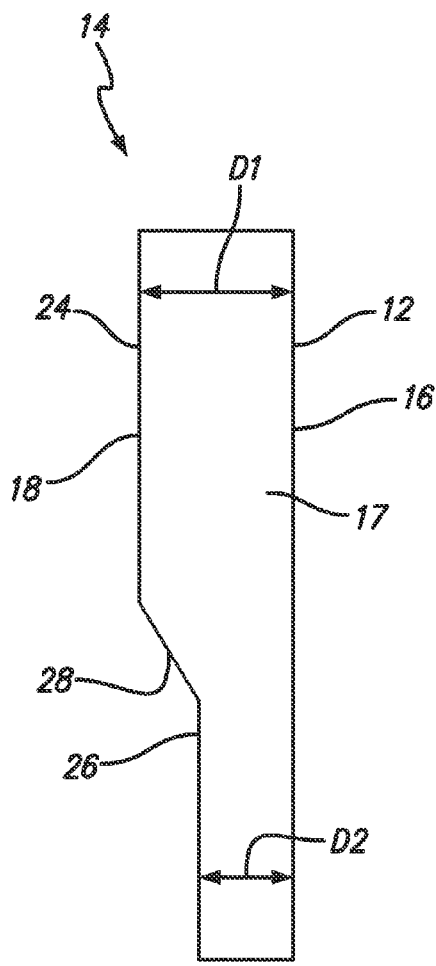
FIG. 18 is a side elevational view of the outside shape of the another embodiment of a monument assembly as taught herein.

As shown in FIG. 3, in a preferred embodiment, the aft wall 18 includes transition panel 28. Transition panel 28 can be curved or arced, as shown, or can be straight, as shown in FIGS. 17-18. It will be appreciated that transition panel 28 is positioned between the upper portion 56 and the lower portion 58 of the closet monument 12. As is best show FIG. 3, in a preferred embodiment, the lower portion 58 has a smaller front to aft dimension (referred to herein as depth) than the upper portion 56. Therefore, upper portion 56 has a greater depth D1 than the depth D2 of the lower portion 58. This allows the closet monument assembly 14 to be positioned aft of where a prior art monument is positioned. This is possible because the lower portion 58 provides ample leg/foot space for a passenger, but allows the upper portion 56 to move aft as a result of the airbag(s) 38 being positioned therein. As a result, the front wall 16 of the closet monument assembly 14 is positioned aft of where the front wall of a prior al monument would be positioned. This allows the possibility of placing more seats in the aircraft.

FIGS. 6-13 show other embodiments of the closet monument assembly 14. It will be appreciated that many of the details, such as the closet doors, etc. are omitted from some the drawings. However, any of the components shown in FIGS. 1-5 are within the scope of the other embodiments.

FIG. 6 shows a closet monument assembly 14 wherein the airbag compartment 34 or housing is secured to the aft wall 18 of the closet monument 12. Furthermore, the aft wall 18 is spaced from the floor of the aircraft to provide further foot room for the passengers.

Figure 7:
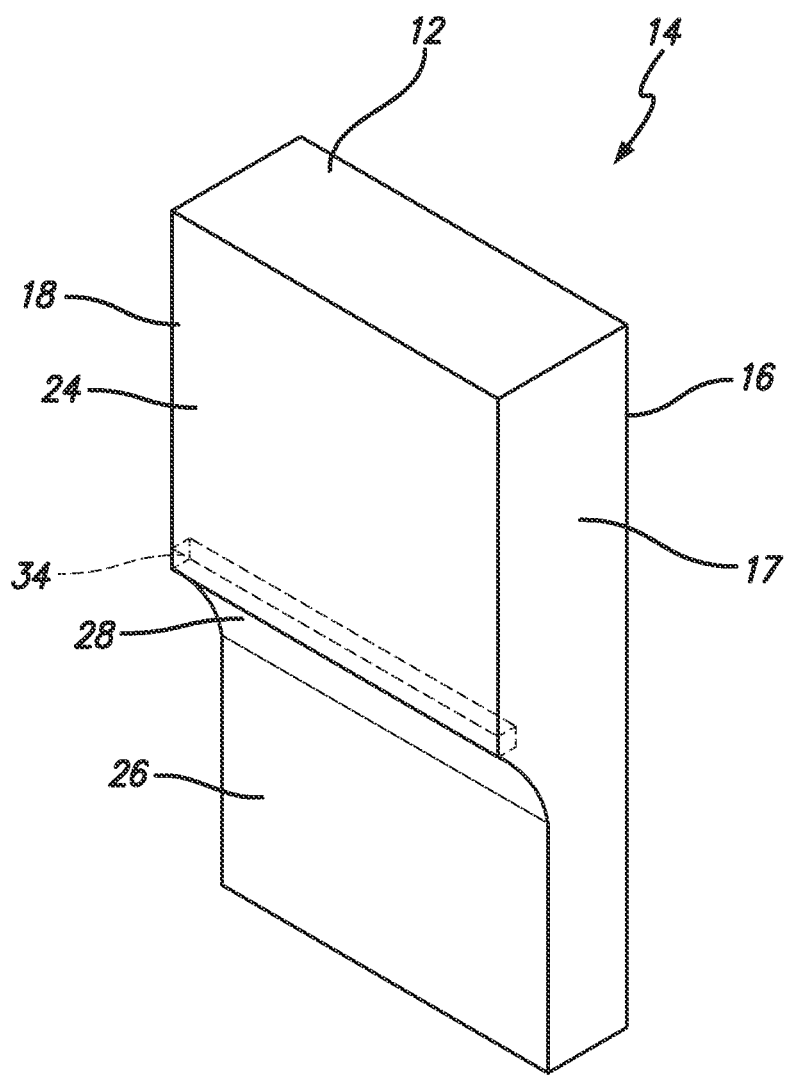
FIG. 7 is a perspective view of a monument assembly in accordance with another preferred embodiment of the present invention.
Figure 7A:
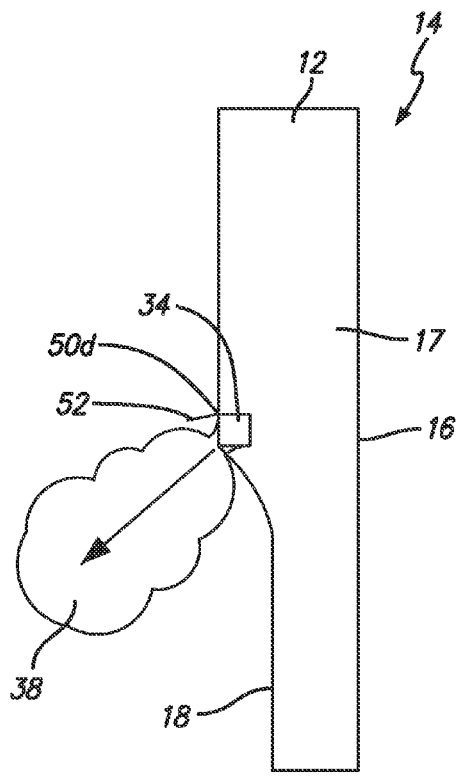
FIG. 7A is a side devotional view of the monument assembly of FIG. 7 with the airbag deployed therefrom.
Figure 7B:
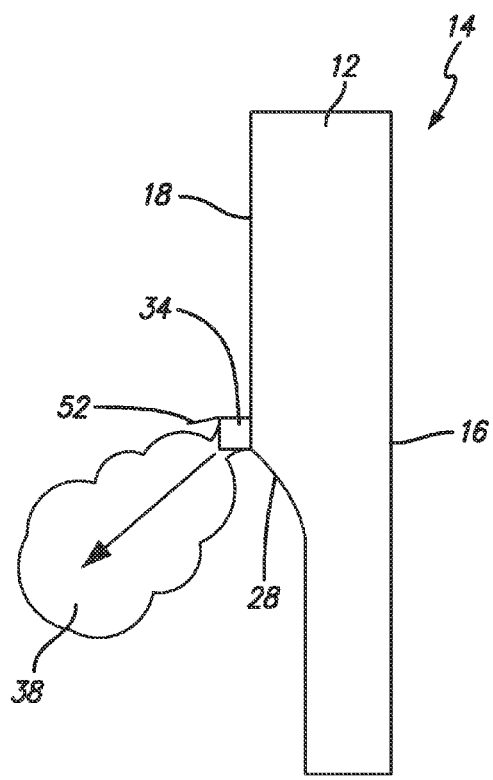
FIG. 7B is a side elevational view of the monument assembly of FIG. 7, but with the airbag system disposed on the aft wall thereof and with the airbag deployed therefrom.

FIG. 7 shows an embodiment of the invention where the airbag compartment 34 or housing in which the airbag 38 is stored is approximately the same width as the closet monument 12. However, this is not a limitation on the present invention; the airbag 38 and/or the housing or compartment 34 in which it is stored can be any width. Also, as shown in FIGS. 7A-7B, the housing can be located inside the monument or attached on the outside thereof. FIGS. 7A-7B also show the flap 52 exploded outwardly after the airbag(s) 38 are deployed.

Figure 8:
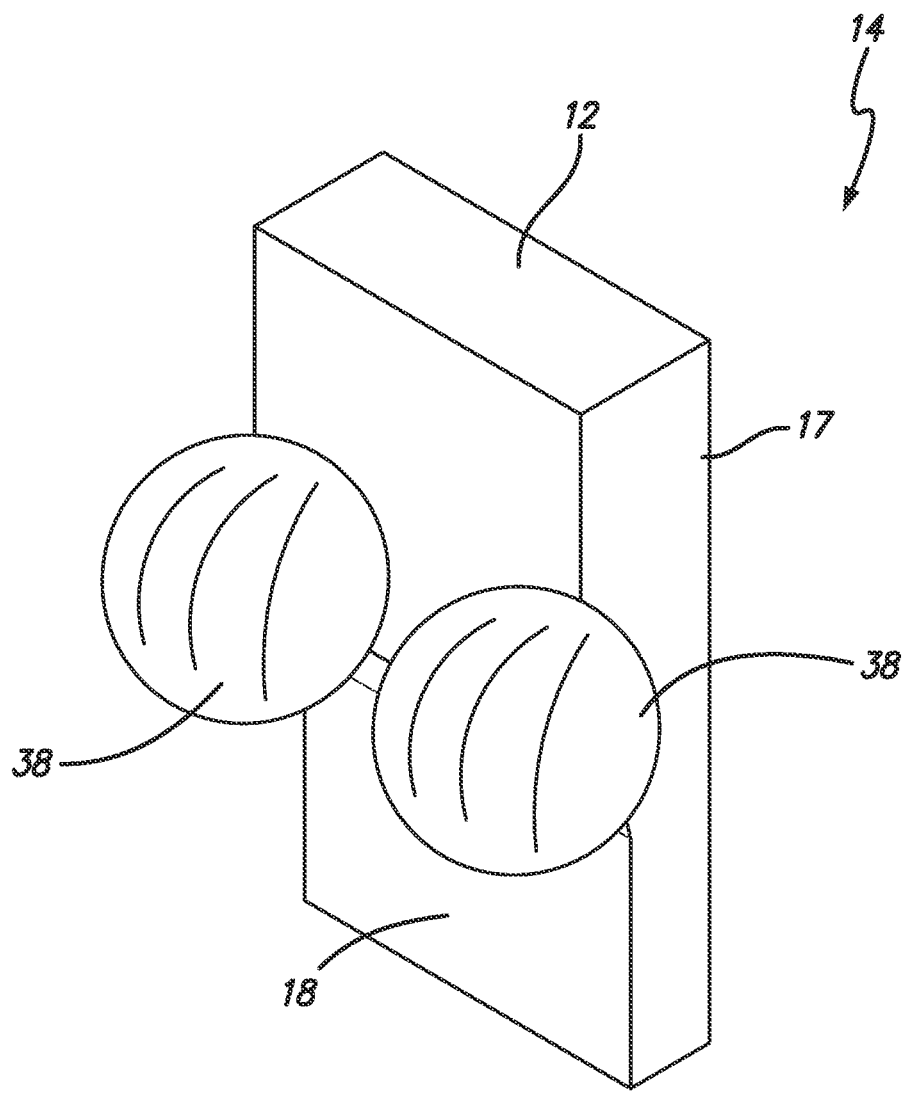
FIG. 8 is a perspective view of a monument assembly with two generally spherical airbags in the deployed position.
Figure 9:
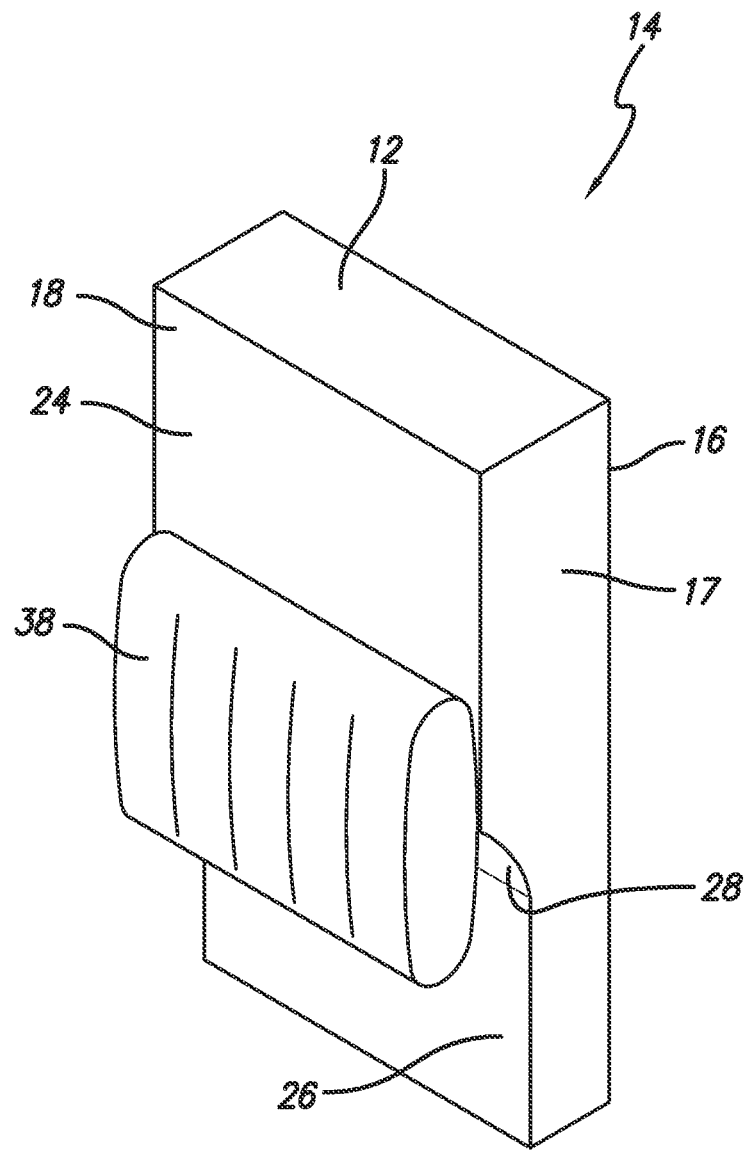
FIG. 9 is a perspective view of a monument assembly with a single airbag in the deployed position in accordance with another preferred embodiment of the present invention.

It will be appreciated by those skilled in the art that any number of airbags and any shaped airbag is within the scope of the present invention. For example, as shown in FIG. 8, the airbags 38 can be round. Furthermore, the round airbags 38 can be associated with an individual passenger or more than one passenger (e.g., a single round airbag for the monument). Or, as shown in FIG. 9, the airbag(s) 38 can be rectangular. Moreover, each seat can have a single airbag or airbags 38 associated therewith. Or, as shown in FIG. 9, a single airbag 38 can be associated with more than one seat or an entire row.

Figure 10:
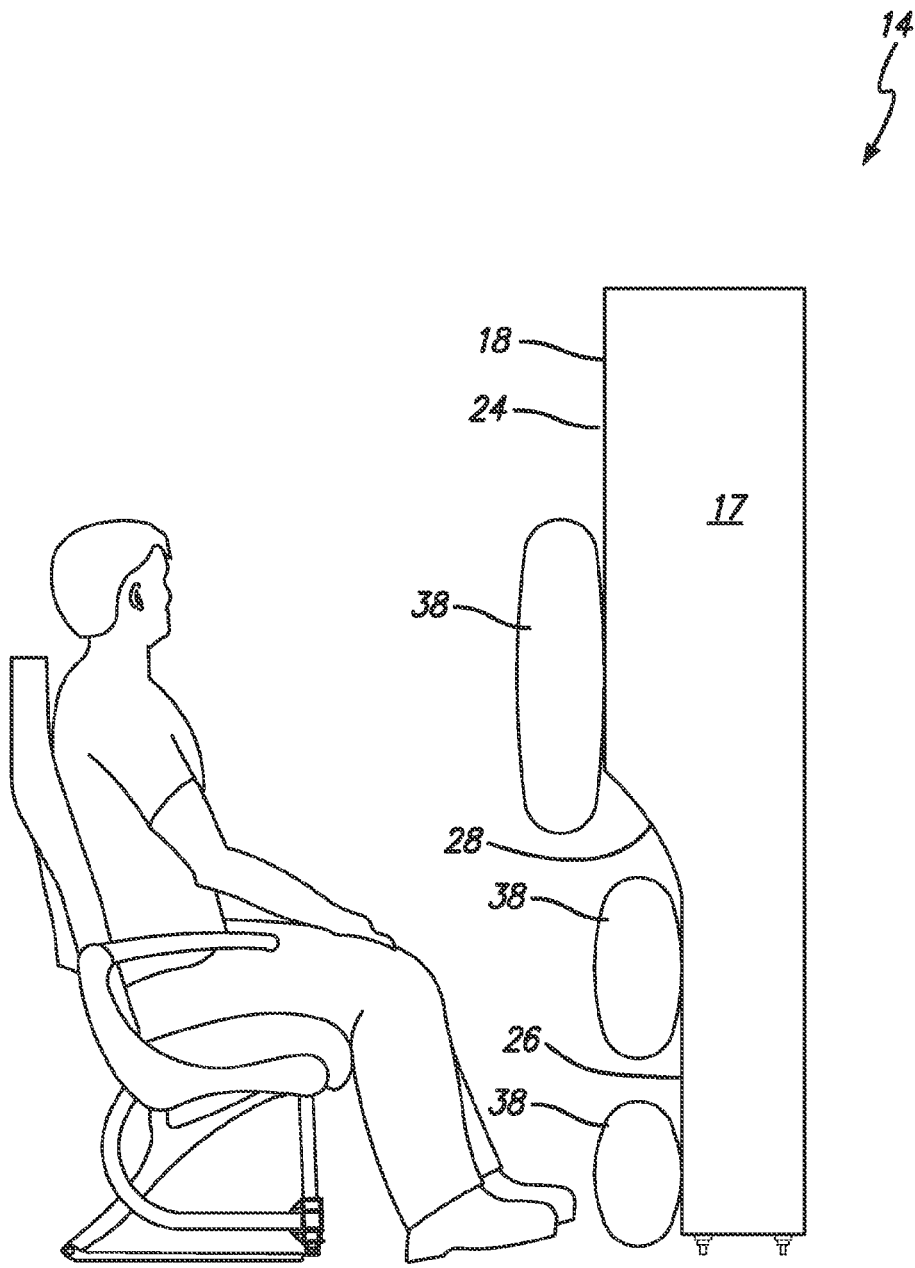
FIG. 10 is a side elevational view of a monument assembly having vertically spaced airbags in accordance with another preferred embodiment of the present invention.
Figure 11:
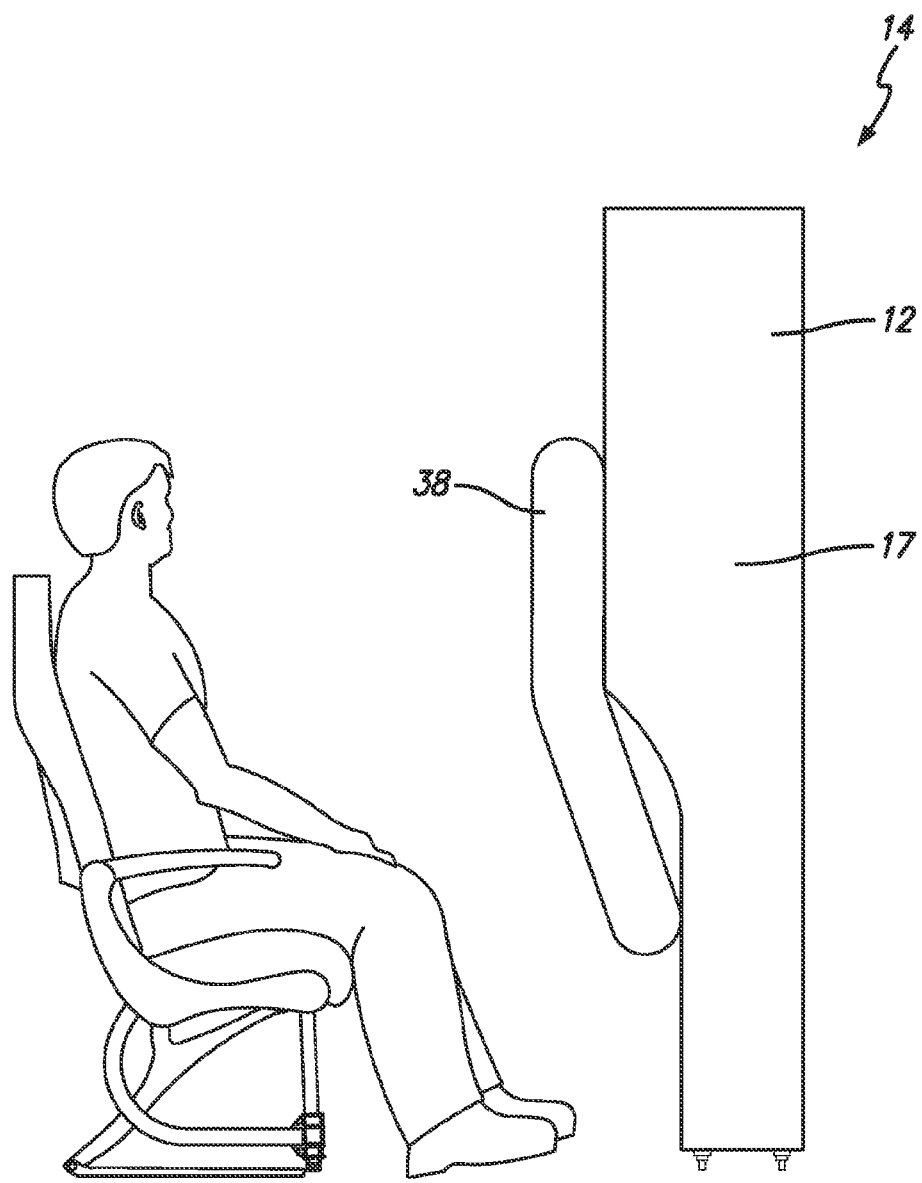
FIG. 11 is a side elevational view of a monument assembly having a single large airbag that protects an entire row in accordance with another preferred embodiment of the present invention.
Figure 12:
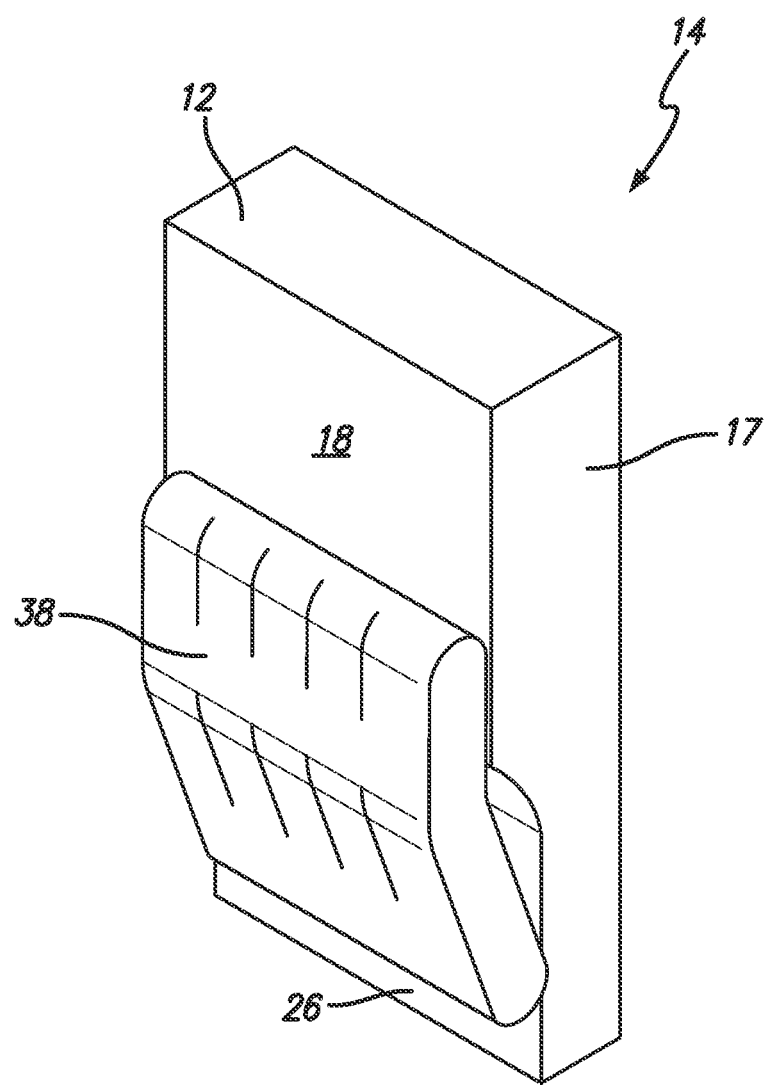
FIG. 12 is a perspective view of the monument assembly of FIG. 11.
Figure 13:
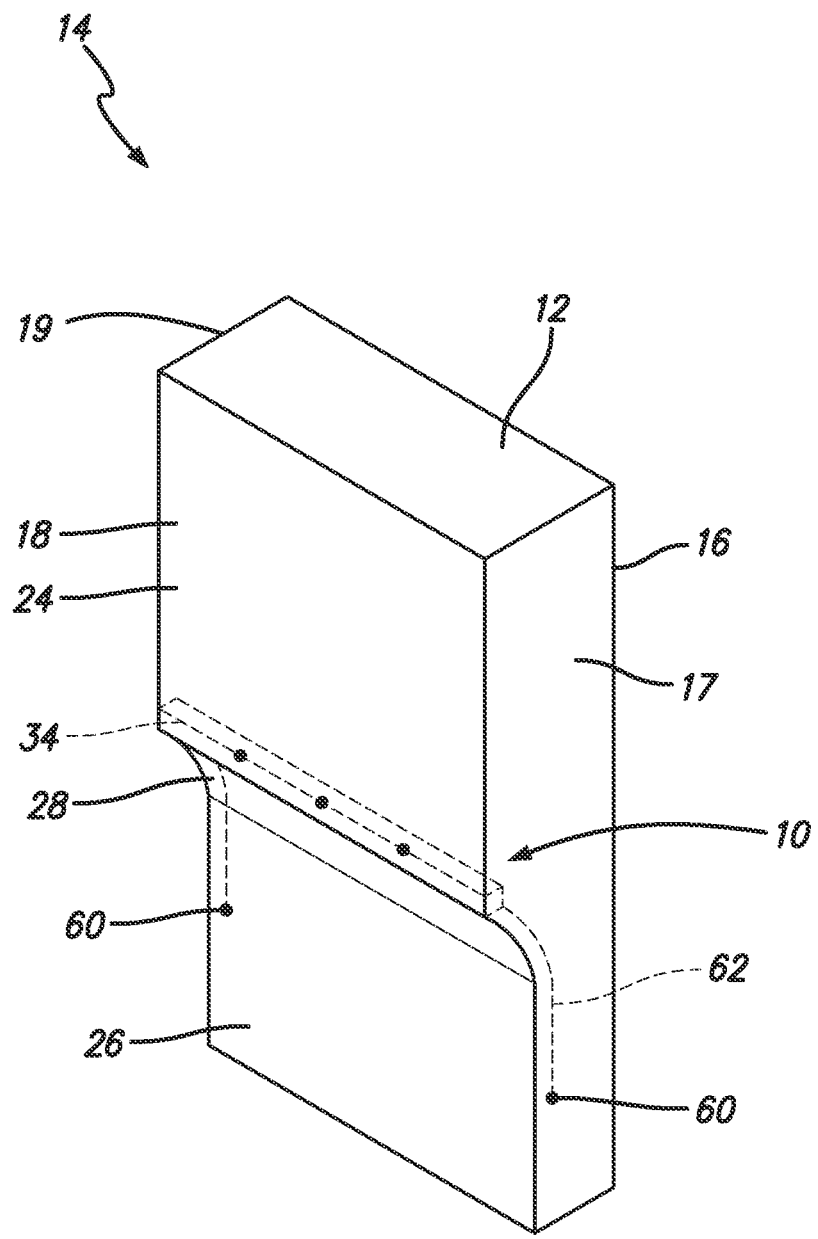
FIG. 13 is a perspective view of a monument assembly with an airbag in the folded position, and with a plurality of attachment points in accordance with another preferred embodiment of the present invention.
Figure 14:
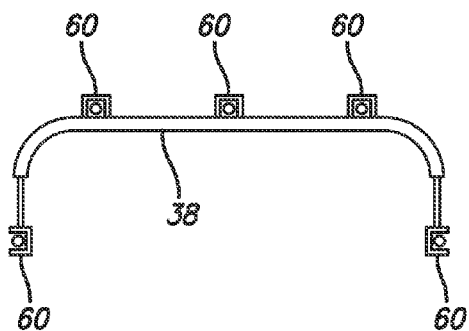
FIG. 14 is a view of the airbag of FIG. 13 in the folded position together with the fixation points.
Figure 15:
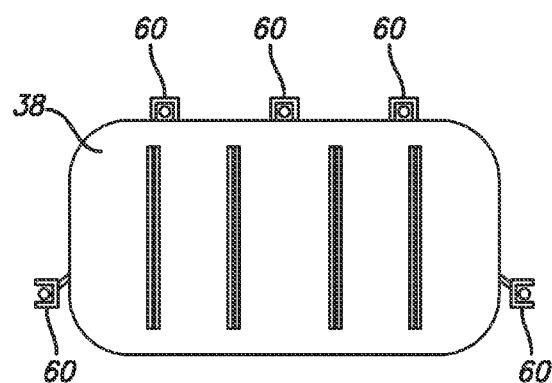
FIG. 15 is a view of the airbag of FIG. 13 after it is inflated.
Figure 16:
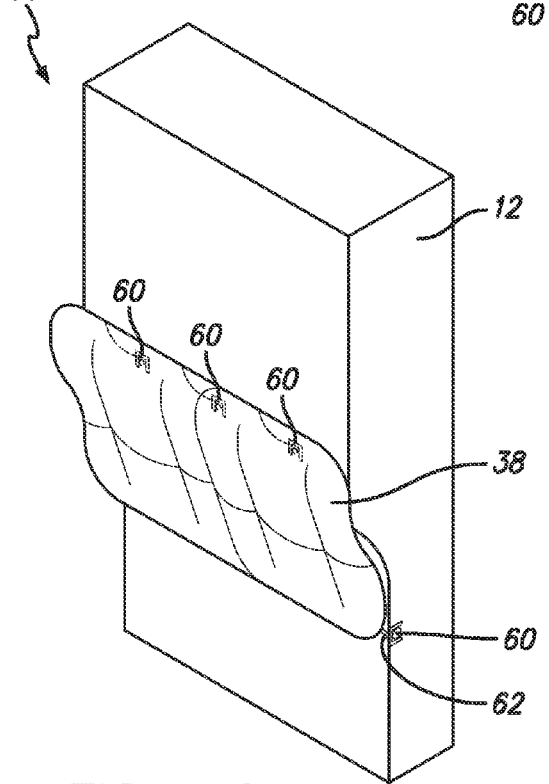
FIG. 16 is a perspective view of the monument assembly of FIG. 13 with the airbag deployed.

As shown in FIG. 10, in another embodiment, multiple airbags 38 can be associated with a single seat to protect different parts of a passenger's body. For example, as shown in FIG. 10, separate airbags 38 positioned for protection of the passenger's head, and portions of the passenger's anatomy below the head, such as the arms, knees and/or feet. In this embodiment, separate airbag modules 32 can be vertically spaced from another. As shown in FIGS. 11-12, in another embodiment, a single large airbag 38 can be deployed to protect multiple portions of a passenger's body.

FIGS. 13-16 show another embodiment where the airbag system 10 includes a plurality of fixation points 60 that help position the deployed airbag 38 as desired. For example, the airbag system 10 can include tethers 62 located below the airbag compartment 34 that help position the lower portion of the airbag 38. These tethers 62 can break through the aft wall 18, as necessary via a line of weakness or the like.

The airbags can be deployed or inflated by any method known in the art. For example, the airbags can be inflated using gas or a pyrotechnic inflator or a hybrid thereof.

Figure 19:
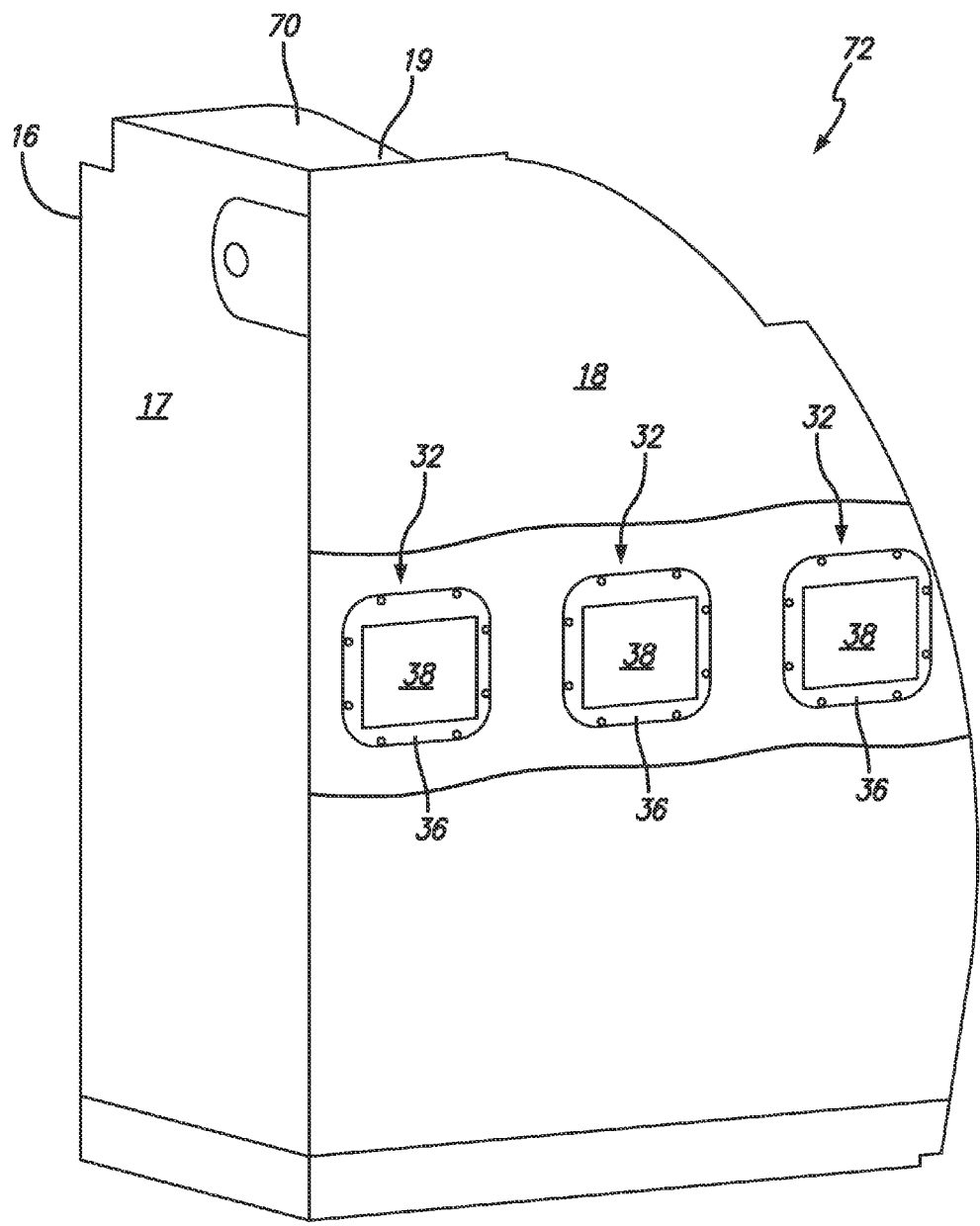
FIG. 19 is a perspective vim of a galley monument assembly in accordance with a preferred embodiment of the present invention and showing a portion of the aft wall cut away to show the airbag modules.

FIGS. 19-26 show another embodiment of the present invention that includes an airbag system 10 that is incorporated in a galley monument 70 (referred to together herein generally as galley monument assembly 72). It will be understood that the inclusion of the airbag system 10 and module in the galley monument is only exemplary and the system can be included in any monument, partition, wall, etc. that is positioned forward of passengers. As shown in FIG. 19, in this the galley monument assembly preferably includes three separate airbag modules 32 positioned on the aft wall 18 that are each associated with a single passenger or seat. It will be appreciated that FIG. 19 shows a portion of the aft wall 18 cut away to see the airbag modules 32. In a preferred embodiment, each airbag module 32 is fully integrated into the wall 18 (which is preferably a honeycomb panel).

Figure 20:
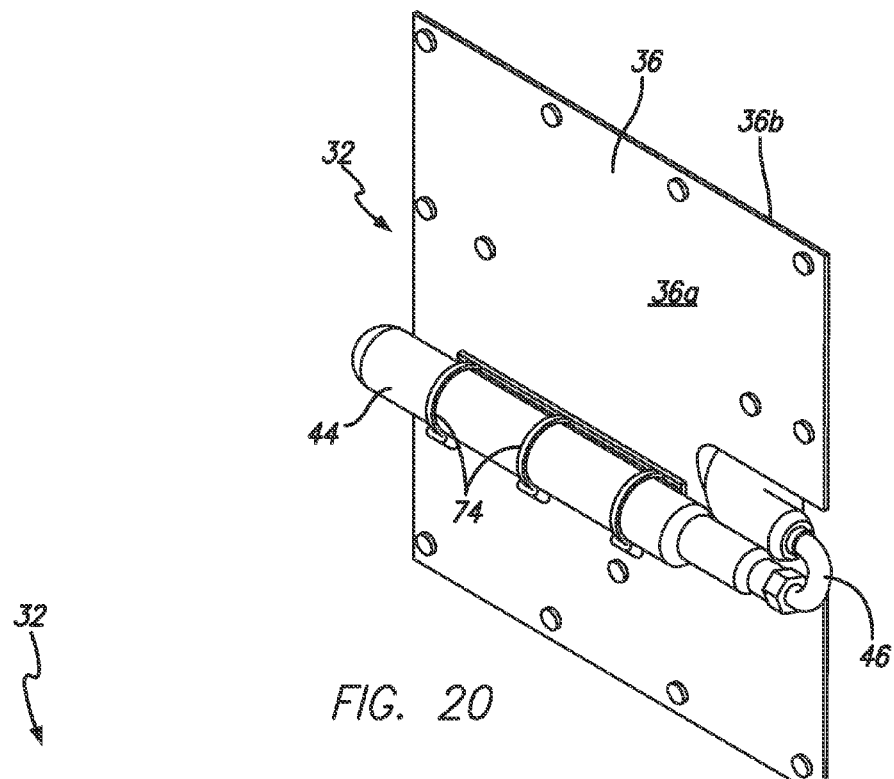
FIG. 20 is a perspective view of an airbag module.

As shown in FIG. 20, in a preferred embodiment, the airbag module 32 includes the airbag support plate 36 with an inflator tank 44 secured to the front surface 36a thereof, by clamps 74 or the like. The folded airbag 38 is secured to the aft surface 36b. The airbag module also includes the necessary inflator tube(s) or hose(s) 46 to connect the inflator tank 44 to the airbag 38. In a preferred embodiment, the airbag module 32, including the airbag support plate 36, inflator tank 44, airbag 38, inflator tube(s) 46 and other necessary components are a single unit that can be installed on the aft wall 18.

Figure 21:
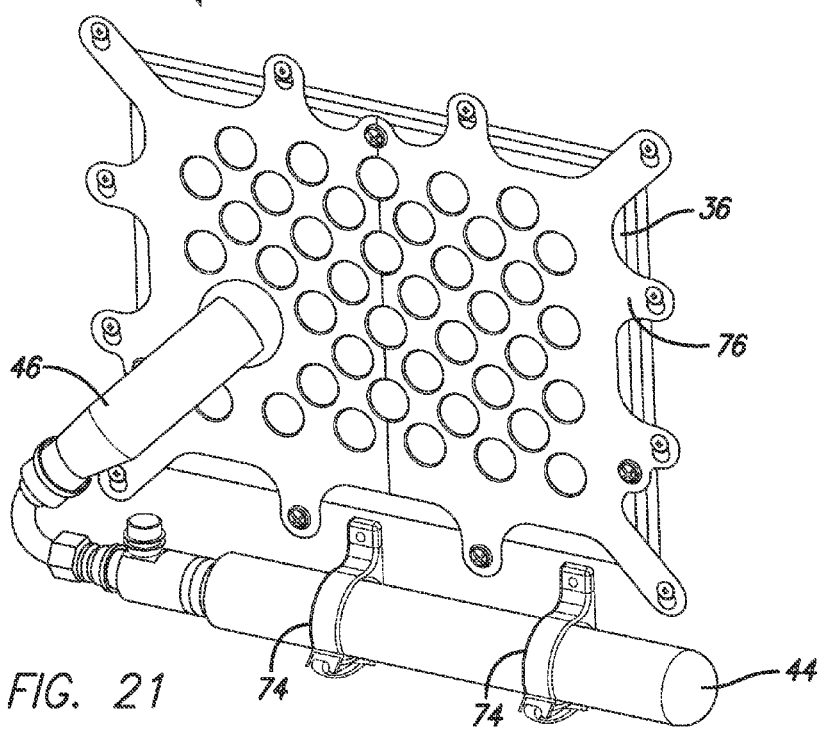
FIG. 21 is a perspective view of an airbag module with the inflator tank at a remote location.

As shown in FIG. 21, in another embodiment, the inflator tank 44 can be located at a remote location. In other words, the inflator tank 44 can be located at a location other than on a surface of the airbag support plate 36 and is separate from the remainder of the airbag module 32. Furthermore, in another embodiment, the airbag module 32 can include a removable cover or door 76 that provides access to the airbag 38 and/or the airbag module 32 for maintenance. In different embodiment, the inflator tank 44 can be mounted on the door 76 or remote from the door 76.

Figure 22:
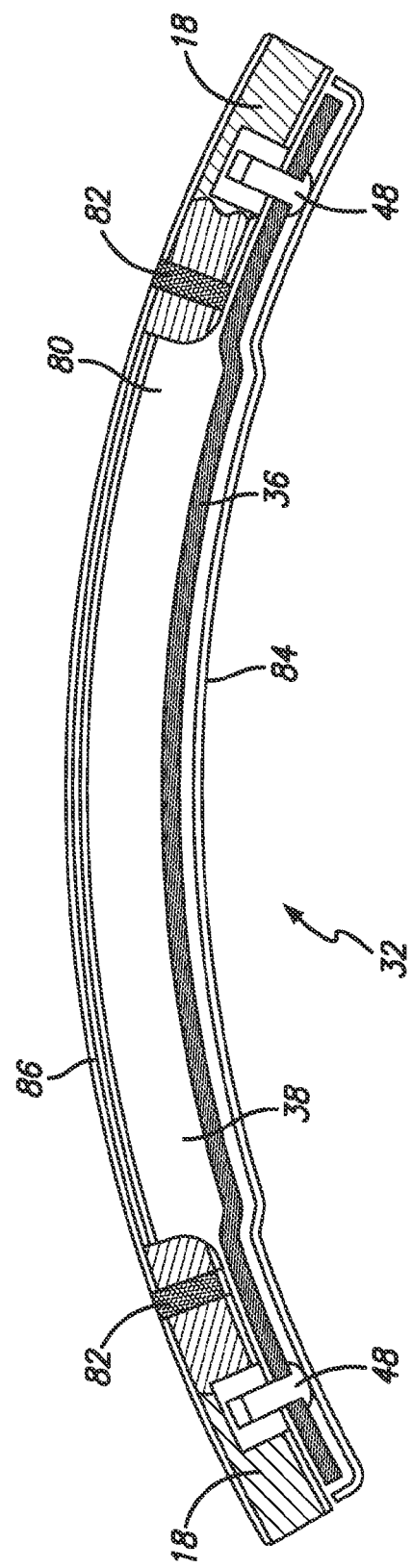
FIG. 22 is a cross-sectional cut away of an airbag module that includes tear seams in accordance with a preferred embodiment of the present invention.
Figure 23:
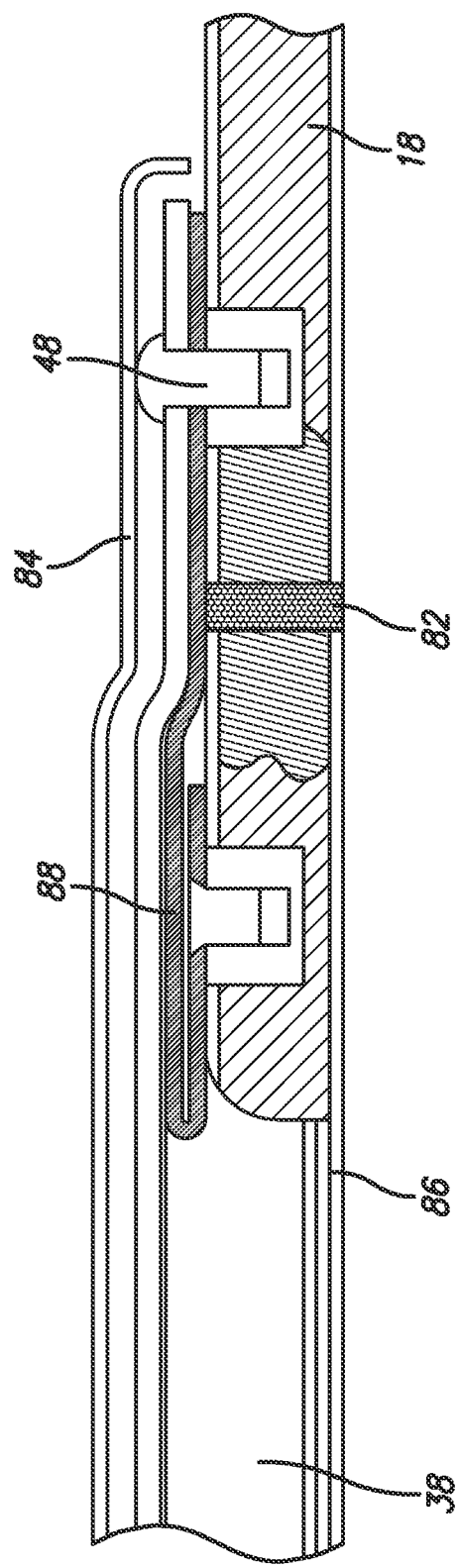
FIG. 23 is a cross-sectional cut away of a portion of the airbag module of FIG. 22 showing a fabric hinge.
Figure 24:
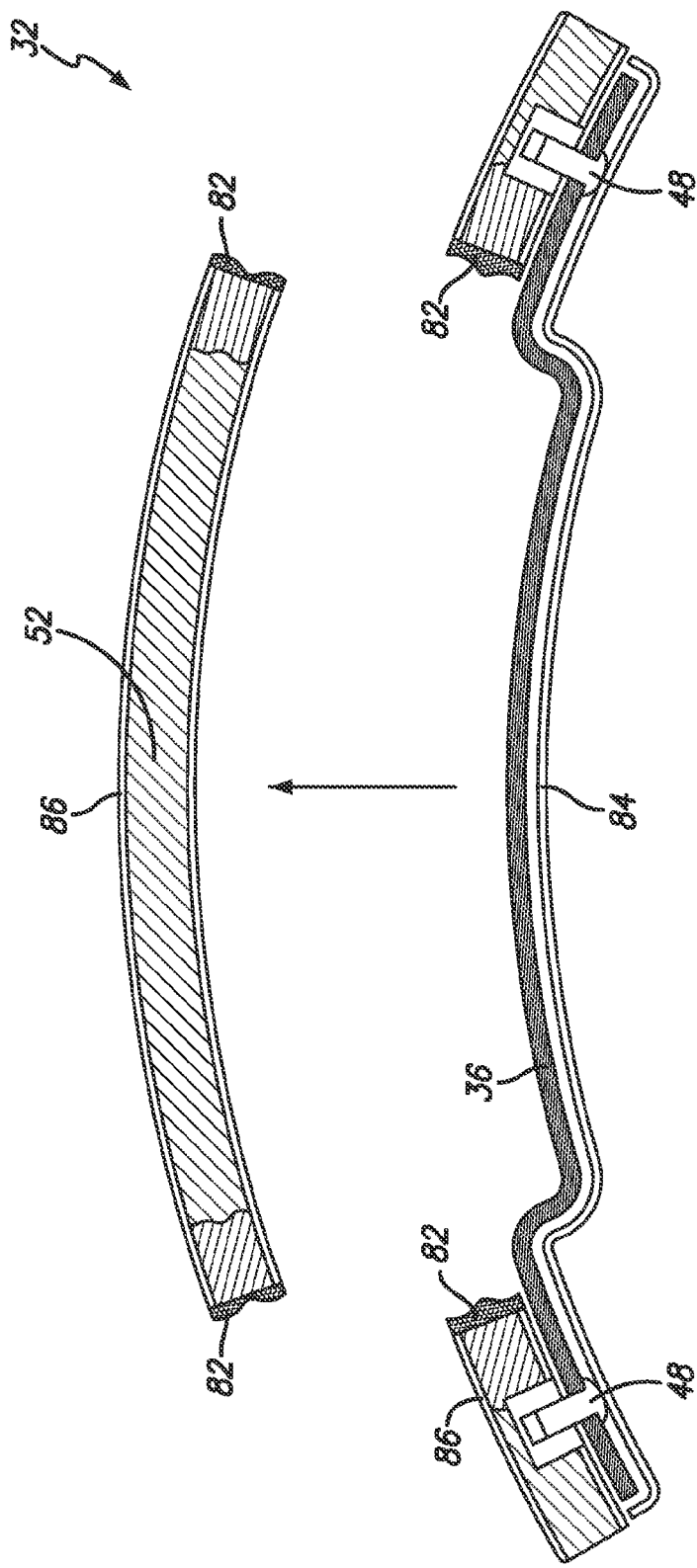
FIG. 24 is a cross-sectional cut away of the airbag module of FIG. 22 with the flap torn away at the tear seam.
Figure 25:
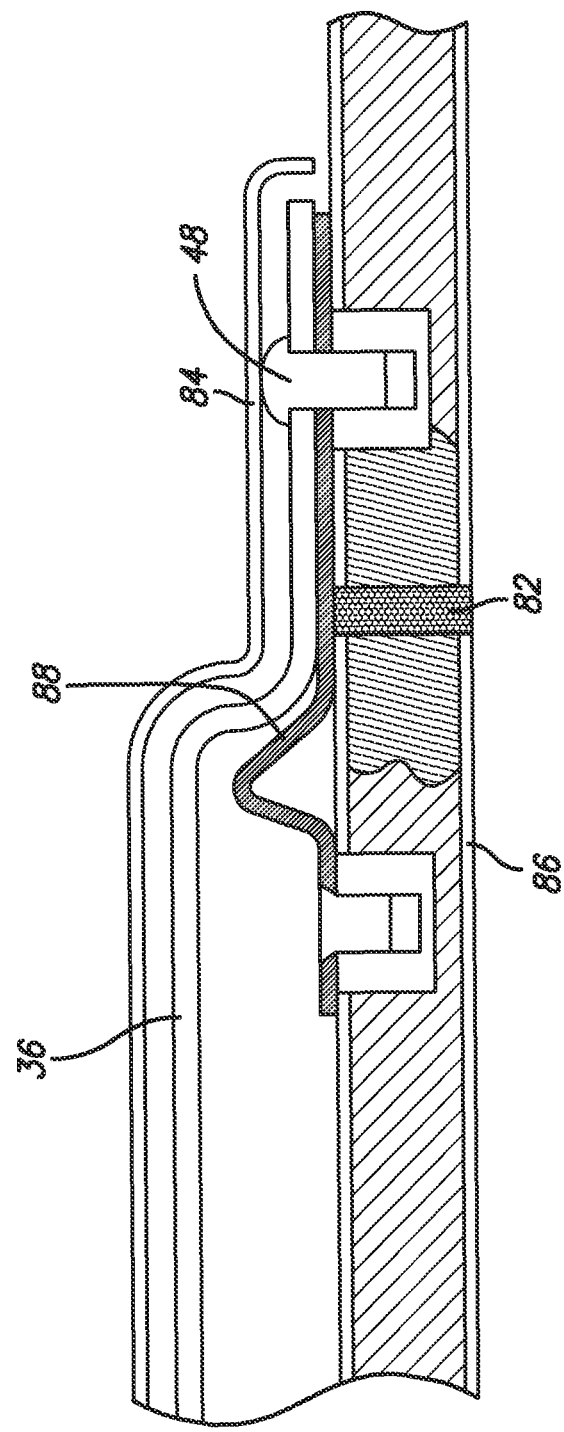
FIG. 25 is another cross-sectional cut away of a portion of the airbag module of FIG. 22 showing a fabric hinge.
Figure 26:
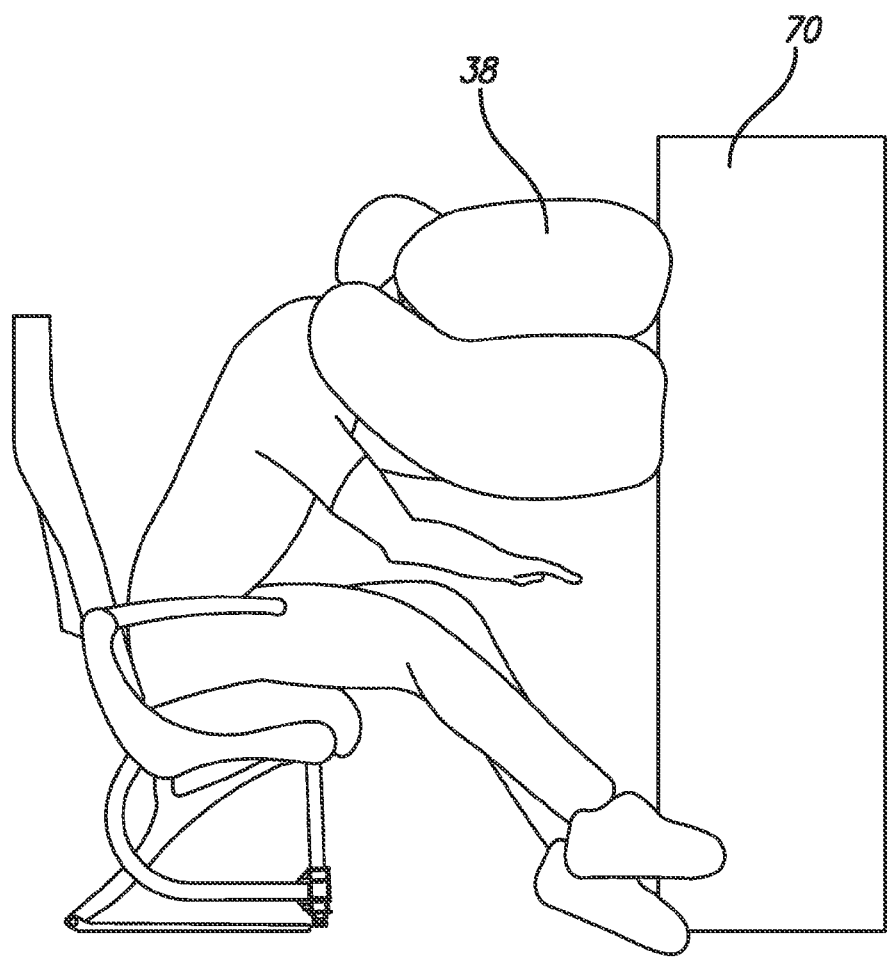
FIG. 26 is a side elevational view of a passenger hitting the airbags after a crash condition.

FIGS. 22-25 show an airbag module 78 that is integrated into the gall 70 aft wall 18 (or any other monument or wall). Generally, this embodiment provides an airbag 38 secured adjacent a flap 52 in the monument aft wall 18 and weakness lines that comprise tear seams 82 that define the flap, and an aft door or cover 84 that tears away when the airbag deploys. In this embodiment, the aft wall 18 includes an opening 80 formed therein which at least partially houses the airbag 38, the airbag support plate 36, a cover or front door 76 and a mechanical perimeter fuse or tear seam 82. The tear seam 82 can be made of any material that is structurally weaker than the aft wall 18 material and that allows the aft door 84 to tear away no that the airbag 38 can deploy. For example, the tear seam 82 can be made of a foam, fabric or other filler material. In a preferred embodiment, the aft wall 18, aft door 84, airbag etc. are covered by a decorative film 86 to help hide the airbags and related components. As shown in FIG. 22, the tear seam 82 can extend into the decorative film 86.

In a preferred embodiment, the airbag module 78 includes a flexible strap or fabric hinge 88 that mechanically attaches the front door 76 to the aft wall 18 and allows front door 76 to be opened for servicing the airbag 38 and related components.

Figure 27:
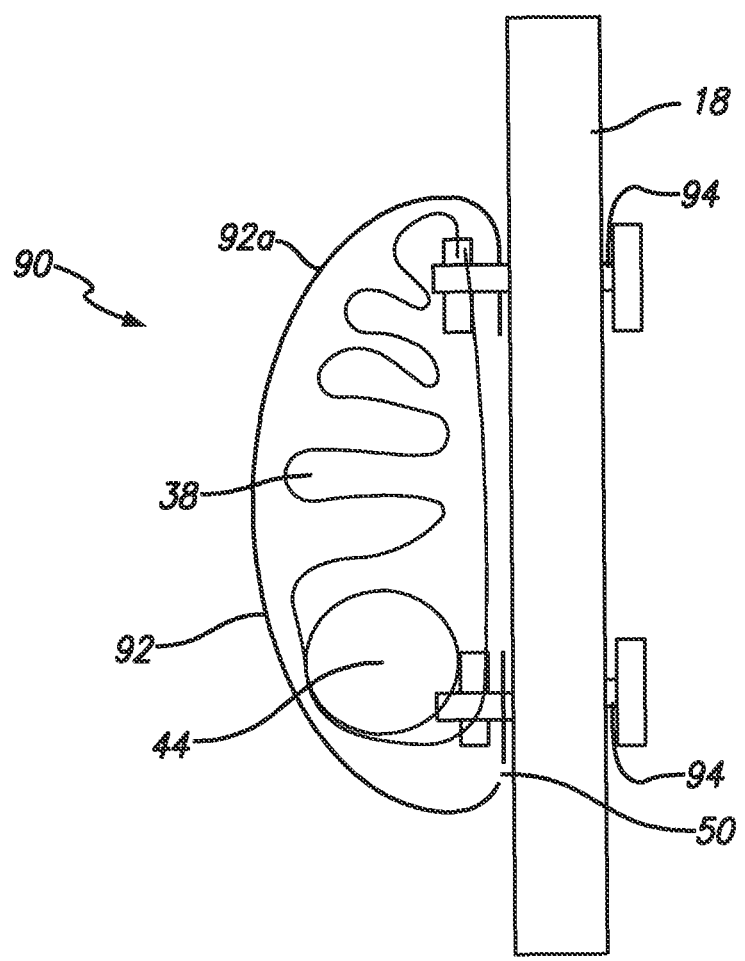
FIG. 27 is a side cross-section of an airbag module in accordance with another preferred embodiment of the present invention.

FIG. 27 shows another embodiment that includes an airbag module 90 that is secured to a monument aft wall 18 and that includes the inflator tank 11, airbag 38 and other necessary components within a housing 92 that includes lines of weakness 50 therein. As shown, the housing 92, airbag 38 and inflator tank 44 include fixations or mounting components 94 for securing the a module 90 to the aft wall 18. In a preferred embodiment, the housing is made of polycarbonate or the like and the upper portion 92a of the housing 92 has a smooth curvature, which will help prevent it from breaking when it hinges upwardly when the airbag is deployed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and no to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An airbag system assembly configured to be positioned in a vehicle interior, the airbag system assembly comprising:
   a closet monument configured to be positioned forward of a passenger seat, wherein the closet monument comprises an upper portion comprising at least a first storage compartment extending between a front surface and an aft surface of the upper portion, the first storage compartment defining a front to aft depth of the upper portion,
   the closet monument further comprising a lower portion, the lower portion comprising at least a second storage compartment extending between a front surface and an aft surface of the lower portion, the second storage compartment defining a front to aft depth of the lower portion, wherein the front to aft depth of the lower portion is smaller than the front to aft depth of the upper portion,
   a transition portion between the upper portion and the lower portion that provides an inwardly curved knee space for a passenger sitting behind the storage monument, the inwardly curved knee space positioned generally above a height of a seat pan of a seat positioned rearwardly of the storage monument,
   a first flap formed by a plurality of weakness lines in at least the aft surface of the upper portion of the storage monument, and
   an airbag system comprising at least a first airbag module having a first airbag support plate with a plate front surface and a plate aft surface, wherein the first airbag support plate is secured to the aft surface of the upper portion of the storage monument, wherein a first airbag configured to deploy in an event of a crash condition is disposed on the plate aft surface of the first airbag support plate.

2. The airbag system assembly of claim 1 wherein the plurality of weakness lines include a left weakness line, a right weakness line and one of a top or a bottom weakness line that cooperate to define a hinge section.

3. The airbag system assembly of claim 1 wherein the airbag system further comprises at least a first inflator tank, and wherein the first inflator tank is positioned on the plate front surface of the first airbag support plate.

4. The airbag system assembly of claim 1 wherein the monument includes an upper panel, a lower panel, and a curved transition panel positioned between the upper and the lower panels, wherein the upper panel and the lower panel are positioned such that they are not aligned vertically.

5. The airbag system assembly of claim 1 wherein the airbag system further comprises at least a first inflator tank, and wherein the first inflator tank is positioned apart from the first airbag support airbag plate in the monument and is connected to the airbag via a gas delivery hose.

6. The airbag system assembly of claim 1 wherein the airbag system includes at least a second airbag module having a second airbag support plate with a plate front surface and a plate aft surface, wherein the second airbag support plate is secured to the aft surface of the monument, wherein the second airbag support plate includes a second airbag configured to deploy in the event of the crash condition and that is disposed on the plate aft surface of the second airbag support plate, wherein the second airbag is positioned adjacent the first flap.

7. The airbag system assembly of claim 6 wherein the second airbag module is positioned below the first airbag module on the monument, wherein the first airbag module is positioned such that it will be contacted by a passenger's head in the event of the crash condition, and wherein the second airbag module is positioned such that it will be contacted by a portion of the passenger's anatomy below the head.

8. A closet monument assembly configured to be positioned in a vehicle interior, the closet monument assembly comprising:
   a closet monument that includes a front wall, an aft wall, an outer wall and an inner wall that cooperate to define a monument interior comprising an upper portion storage area and a lower portion storage area, wherein the inner wall includes at least a first door that provides access to the storage area of the upper portion, wherein the upper portion and the lower portion are not aligned vertically, a transition between the upper portion and the lower portion configured to provide an inwardly curved knee space that provides knee room for a passenger seated behind the aft wall, the inwardly curved knee space positioned generally above a height of a seat pan of a seat positioned rearwardly of the monument, and
   an airbag system mounted on the aft wall or disposed within the monument interior, wherein the airbag system includes at least a first airbag that is configured to deploy in an event of a crash condition.

9. The closet monument assembly of claim 8 wherein the aft wall includes a front surface and an aft surface, wherein the airbag system is disposed within the monument interior and is secured to the front surface of the aft wall, wherein the aft wall includes a first flap that is formed by a plurality of weakness lines in the front surface thereof to form a tear seam, and wherein the first airbag is positioned adjacent the first flap.

10. The closet monument assembly of claim 8 further comprising a plurality of weakness lines comprising a left weakness line, a right weakness line and one of a top or a bottom weakness line that cooperate to define a hinge section.

11. The closet monument assembly of claim 10 wherein the airbag system is at least partially housed within an airbag compartment, and wherein the inner wall includes an airbag access door that provides access to the airbag compartment.

12. The closet monument assembly of claim 8 wherein the airbag system includes an airbag module that comprises an airbag support plate having a front surface and an aft surface, wherein the first airbag is disposed on the aft surface of the airbag support plate, and wherein the airbag support plate is secured to the aft wall of the closet monument.

13. The closet monument assembly of claim 12 wherein the airbag system further comprises at least a first inflator tank, and wherein the first inflator tank is positioned on the front surface of the airbag support plate.

14. The closet monument assembly of claim 12 wherein the airbag system further comprises at least a first inflator tank, and wherein the first inflater tank is positioned apart from the first airbag support airbag plate in the monument and is connected to the airbag via a gas delivery hose.

15. The closet monument assembly of claim 8 wherein the upper portion has a greater depth than the lower portion.

16. The closet monument assembly of claim 15 wherein the aft wall includes an upper panel, a lower panel and a curved transition panel positioned between the upper and the lower panels, wherein the upper panel and the lower panel are positioned such that they are not aligned vertically.

17. The closet monument assembly of claim 16 wherein the airbag system includes an airbag module that comprises an airbag support plate having a front surface and an aft surface, wherein the first airbag is disposed on the aft surface of the airbag support plate, and wherein the airbag support plate is secured to the aft wall.

18. The closet monument of claim 16 wherein the upper panel of the aft wall includes a front surface and an aft surface, wherein the airbag system is disposed within the monument interior and is secured to the front surface of the upper panel, wherein the aft wall includes a first flap that is formed by a plurality of weakness lines in the front surface thereof, and wherein the first airbag is positioned adjacent the first flap.

19. The closet monument assembly of claim 18 wherein the airbag system is housed within an airbag compartment, and wherein the inner wall includes an airbag access door that provides access to the airbag compartment.

20. An airbag system assembly configured to be positioned in an aircraft interior, the airbag system assembly comprising:

a storage monument positioned forward of a passenger seat, the storage monument comprising a front surface and an aft surface, the aft surface defining a lower portion and an upper portion, the upper portion comprising a first depth extending throughout an entirety of the upper portion and forming an upper storage area, the lower portion comprising a second depth extending throughout an entirety of the lower portion and forming a lower storage area, wherein the first depth is larger than the second depth, a difference between the first depth and the second depth forming an inwardly curved knee space for a passenger sitting behind the monument, a first flap formed by a plurality of weakness lines in the aft surface of the monument, and an airbag system comprising at least a first airbag module having a first airbag support plate with a plate front surface and a plate aft surface, wherein the first airbag support plate is secured to the aft surface of the monument, wherein a first airbag configured to deploy in an event of a crash condition is disposed on the plate aft surface of the first airbag support plate.

* * * * *